(12) United States Patent
Seo et al.

(10) Patent No.: US 12,069,418 B2
(45) Date of Patent: Aug. 20, 2024

(54) ELECTRONIC DEVICE INCLUDING MICROPHONE AND FLASH MODULE

(71) Applicant: SAMSUNG ELECTRONICS CO., LTD., Suwon-si (KR)

(72) Inventors: Soohyun Seo, Suwon-si (KR); Hyunggwang Kang, Suwon-si (KR); Myunghoon Kwak, Suwon-si (KR); Yangwook Kim, Suwon-si (KR); Hyunsuk Kim, Suwon-si (KR); Sanghyuk Park, Suwon-si (KR); Youngmin Ji, Suwon-si (KR); Nakhyun Choi, Suwon-si (KR); Changryong Heo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 30 days.

(21) Appl. No.: 17/975,160

(22) Filed: Oct. 27, 2022

(65) Prior Publication Data

US 2023/0199359 A1 Jun. 22, 2023

Related U.S. Application Data

(63) Continuation of application No. PCT/KR2022/014110, filed on Sep. 21, 2022.

(30) Foreign Application Priority Data

Dec. 17, 2021 (KR) .................. 10-2021-0181343
Jan. 10, 2022 (KR) .................. 10-2022-0003626

(51) Int. Cl.
*H04R 1/04* (2006.01)
*H04N 23/51* (2023.01)
(Continued)

(52) U.S. Cl.
CPC .............. *H04R 1/04* (2013.01); *H04N 23/51* (2023.01); *H04N 23/57* (2023.01); *H04R 1/08* (2013.01);
(Continued)

(58) Field of Classification Search
CPC .......... H04R 1/04; H04R 1/08; H04R 1/2853; H04R 2499/11; H04N 23/51; H04N 23/57; H04N 23/52; H04N 23/54; H04N 23/56
See application file for complete search history.

(56) References Cited

U.S. PATENT DOCUMENTS 9,326,057 B2  4/2016  Lee
10,491,786 B2  11/2019  Sanford et al.
(Continued)

FOREIGN PATENT DOCUMENTS

EP  4 024 833  7/2022
KR  10-1994-0026748  12/1994
(Continued)

OTHER PUBLICATIONS

International Search Report mailed Jan. 2, 2023 in International Application No. PCT/KR2022/014110 with English translation (6 pages).

(Continued)

*Primary Examiner* — Tuan D Nguyen
(74) *Attorney, Agent, or Firm* — Nixon & Vanderhye, P.C.

(57) ABSTRACT

An electronic device includes: a plate at least partially inserted into a first opening and including a transparent portion including a protruding portion having a gap spaced apart from an inner circumference of the first opening of the housing and a second opening spaced apart from a periphery of the protruding portion, a sidewall in which a plate
(Continued)

including the transparent portion extends from a first printed circuit board in the housing towards the plate including the transparent portion, a second printed circuit board supported by the sidewall, a flash module comprising a flash disposed on one surface of the second printed circuit board facing the plate including the transparent portion, and a microphone disposed in a space formed through the at least one sidewall, and the second printed circuit board includes a through hole facing the microphone so that the microphone obtains an audio signal.

20 Claims, 20 Drawing Sheets

(51) Int. Cl.
*H04N 23/57* (2023.01)
*H04R 1/08* (2006.01)
*H04R 1/28* (2006.01)

(52) U.S. Cl.
CPC ........ *H04R 1/2853* (2013.01); *H04R 2499/11* (2013.01)

(56) References Cited

U.S. PATENT DOCUMENTS

| | | | |
|---|---|---|---|
| 11,611,058 | B2 | 3/2023 | Chen et al. |
| 11,706,520 | B2 | 7/2023 | Gummadi et al. |
| 11,908,415 | B2 | 2/2024 | Youn et al. |
| 2018/0241861 | A1 | 8/2018 | Kim et al. |
| 2021/0037125 | A1 | 2/2021 | Jung et al. |
| 2021/0144242 | A1 | 5/2021 | Choi et al. |
| 2022/0210957 | A1 | 6/2022 | Yun et al. |
| 2023/0251552 | A1 | 8/2023 | Cao |

FOREIGN PATENT DOCUMENTS

| | | | |
|---|---|---|---|
| KR | 10-2018-0096178 A | | 8/2018 |
| KR | 10-2020-0032911 A | | 3/2020 |
| KR | 10-2021-0057593 A | | 5/2021 |
| KR | 10-2021-0101462 | | 8/2021 |
| KR | 10-2021-0101462 A | | 8/2021 |
| KR | 10-2021-0147327 A | | 12/2021 |
| KR | 20220168794 A | * | 12/2022 |
| KR | 10-2023-0026425 | | 2/2023 |
| KR | 10-2023-0088690 | | 6/2023 |
| KR | 10-2024-0038057 | | 3/2024 |

OTHER PUBLICATIONS

Written Opinion mailed Jan. 2, 2023 in International Application No. PCT/KR2022/014110 (5 pages).

* cited by examiner

ELECTRONIC DEVICE INCLUDING MICROPHONE AND FLASH MODULE

CROSS-REFERENCE TO RELATED APPLICATIONS

This application is a continuation of International Application No. PCT/KR2022/014110 designating the United States, filed on Sep. 21, 2022, in the Korean Intellectual Property Receiving Office and claiming priority to Korean Patent Application No. 10-2021-0181343, filed on Dec. 17, 2021, in the Korean Intellectual Property Office, and to Korean Patent Application No. 10-2022-0003626, filed on Jan. 10, 2022, in the Korean Intellectual Property Office, the disclosures of all of which are incorporated by reference herein in their entireties.

BACKGROUND

Field

The disclosure relates to an electronic device including a microphone and a flash module.

Description of Related Art

An electronic device such as a smartphone may include a camera to obtain an object positioned outside the electronic device and/or an image around the electronic device. Audio signals included in the video obtained through the processor may be obtained through at least one microphone included in the electronic device.

Meanwhile, the electronic device may include a flash module that emits light for obtaining an image when the electronic device is positioned in a dark environment.

Due to improvement of camera performance, length of a barrel of a camera may be increased. When a flash module is disposed on a board of the same height as the camera, a window transmitting light emitted from the flash module may be disposed spaced apart from the flash module. Due to separation between the flash module and the window, emission angle (or arrival area) of light emitted from the flash module may be narrowed. When the emission angle of light emitted from the flash module is narrowed, the performance of the flash module and/or the camera may be degraded. In a dark environment, a flash module adjacent to the camera may be required to obtain an image through the camera, and a microphone adjacent to the camera and/or the flash module may be required to obtain a video including an audio synchronized with the image obtained from the camera. A separate mounting space may be required in an electronic device for disposing a microphone for obtaining an audio signal adjacent to the camera and/or the flash module. There is a need for a method to secure a mounting space for the microphone while securing the emission angle of the light emitted from the above-described flash module.

SUMMARY

According to various example embodiments of the present disclosure, an electronic device may comprise: a housing including a first opening, a plate including a transparent portion, the plate including a protruding portion having a gap spaced apart from an inner circumference of the first opening, at least a portion of the protruding portion inserted into the first opening, and a second opening spaced apart from a periphery of the protruding portion, a first printed circuit board disposed within the housing, a second printed circuit board spaced apart from the first printed circuit board, at least one sidewall disposed between the first printed circuit board and the second printed circuit board, a microphone disposed on a first surface of the second printed circuit board within a space surrounded by the first printed circuit board, the second printed circuit board and the at least one side wall, and a flash module comprising a flash disposed a second surface of the second printed circuit board opposite to the first surface. The second printed circuit board may include a through hole facing the microphone for microphone to obtain an audio signal.

According to various example embodiments of the present disclosure, an electronic device may comprise: a housing including a first opening and a second opening, a plate including a transparent portion including a protruding portion inserted into the first opening and a second opening spaced apart from the protruding portion, a first printed circuit board disposed in the housing, a second printed circuit board disposed on the at least one sidewall, at least one sidewall disposed between the first printed circuit board and the second printed circuit board, a microphone disposed on the first surface of the second printed circuit board, in a space surrounded by the first printed circuit board, the second printed circuit board and the at least one sidewall, and a flash module comprising a flash disposed a second surface of the second printed circuit board opposite to the first surface, wherein the second opening may be spaced apart from the plate including the transparent portion and may face the second printed circuit board, and wherein the second printed circuit board may include a through hole configured to transmit an audio signal with the microphone.

According to various example embodiments of disclosure, since an electronic device has a structure for disposing a microphone in a reduced space, the electronic device can provide a wider space for mounting other components. Since the electronic device has a structure that reduces distance between the microphone and the microphone hole, the electronic device can provide a short audio path.

The effects that can be obtained from the present disclosure are not limited to those described above, and any other effects not mentioned herein will be clearly understood by those having ordinary knowledge in the art to which the present disclosure belongs, from the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
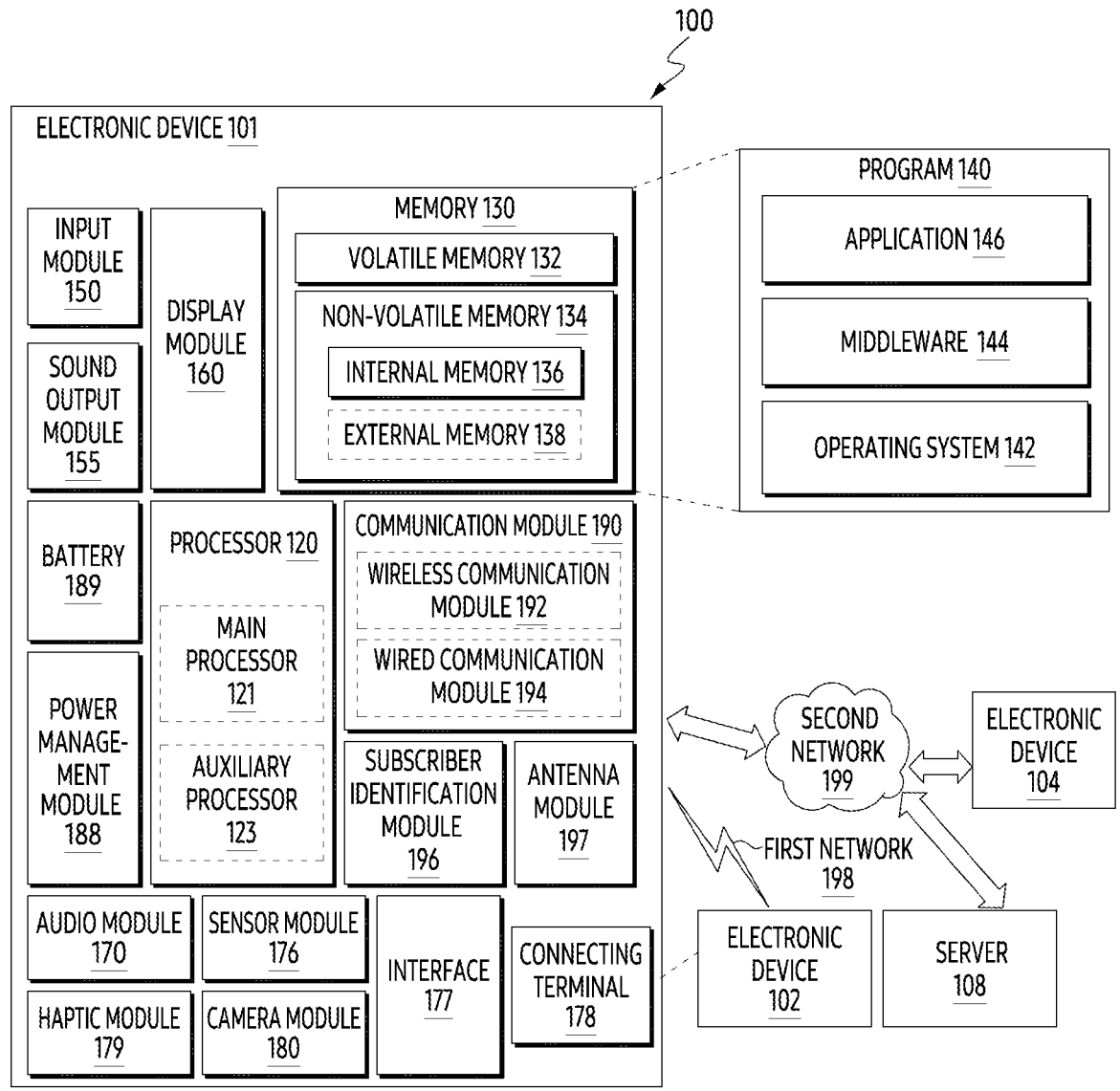
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IOT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
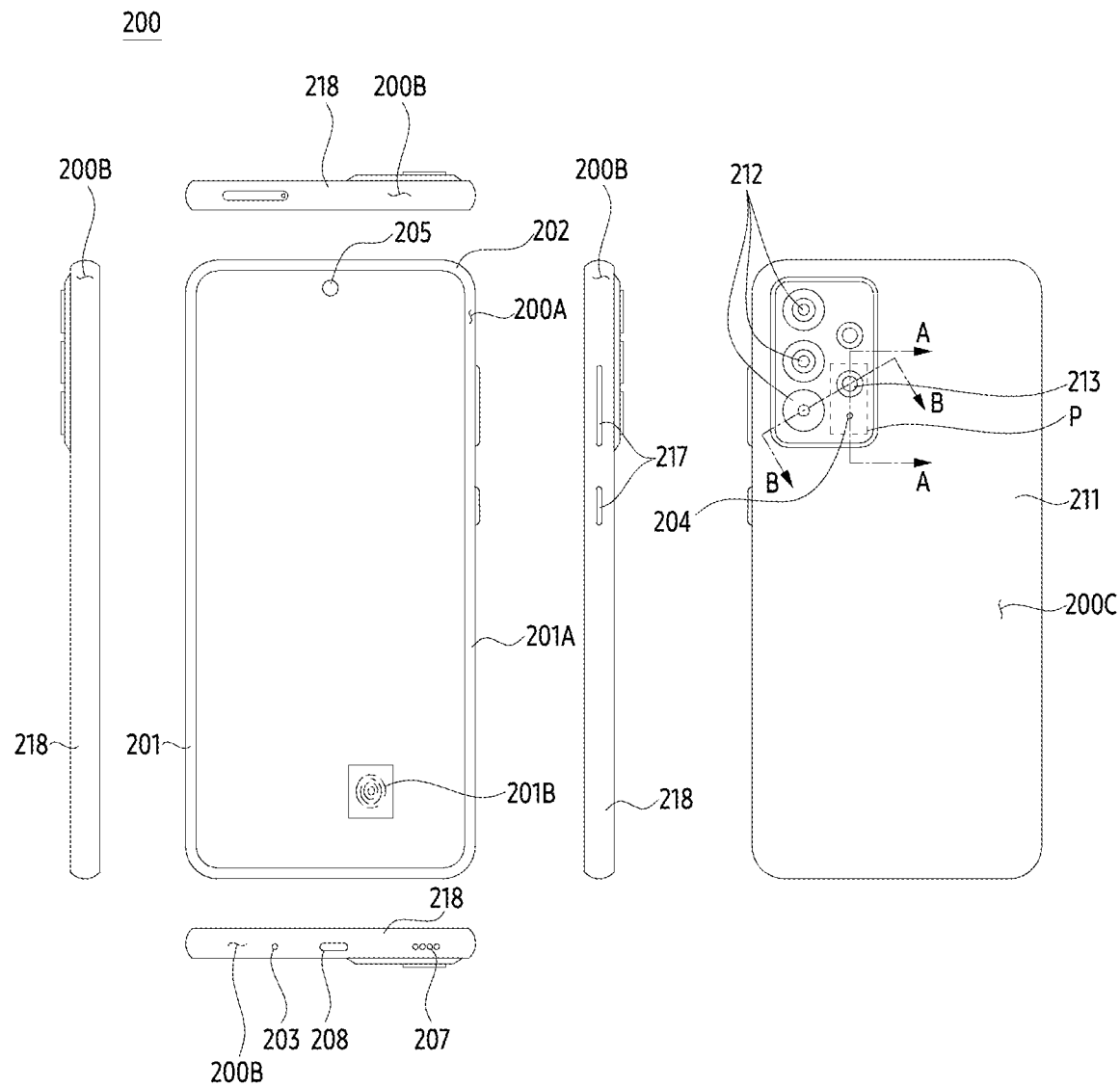
FIG. 2 is a diagram illustrating an example electronic device according to an embodiment.
Figure 3:
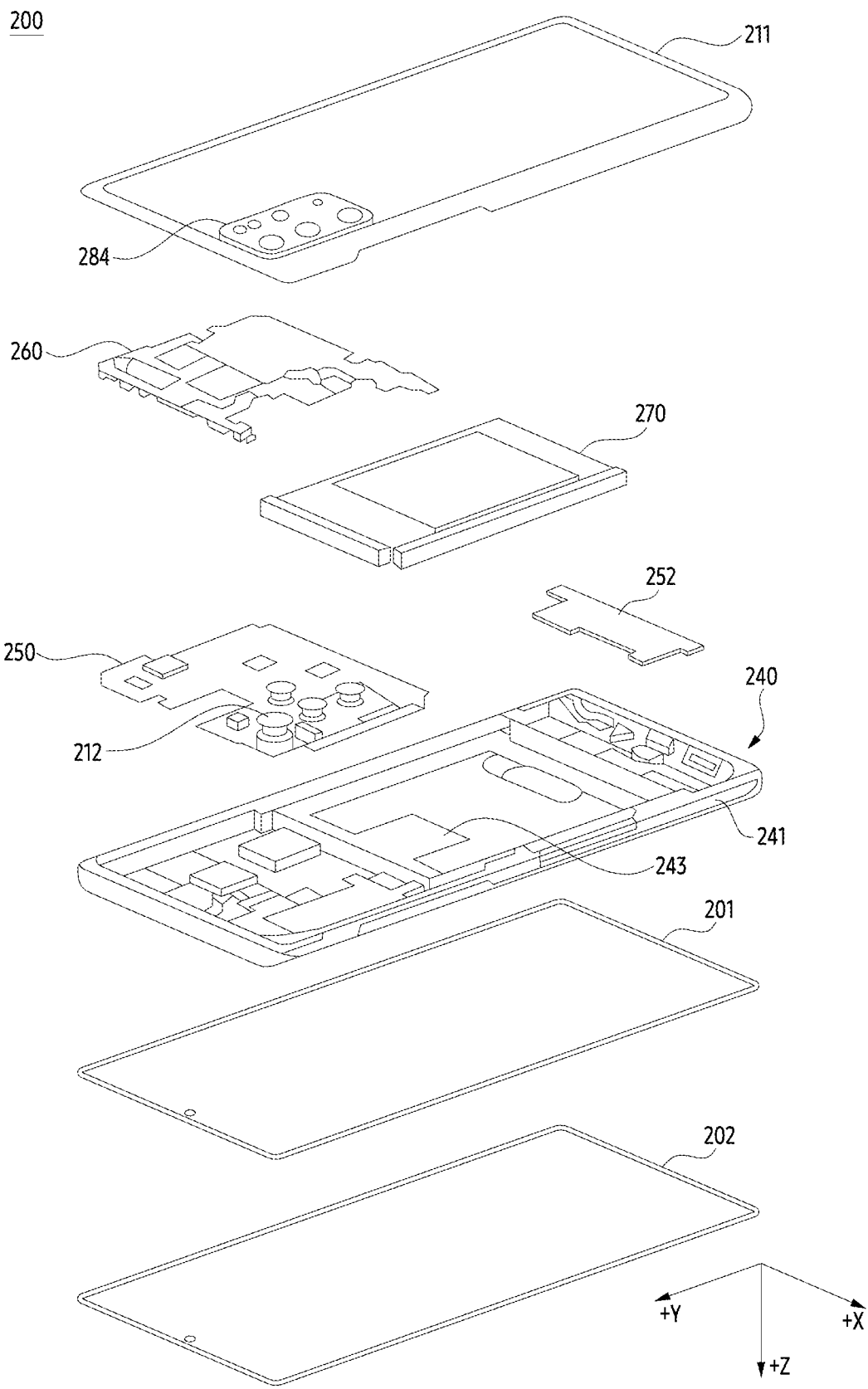
FIG. 3 is an exploded perspective view of an electronic device according to an embodiment.

FIG. 2 is a diagram illustrating an example electronic device according to embodiment, and FIG. 3 is an exploded perspective view of an electronic device according to an embodiment.

Referring to FIG. 2, an electronic device 200 (e.g., an electronic device 101 of FIG. 1) according to an embodiment may include a housing 230 forming an exterior of the electronic device 200. For example, the housing 230 may include a first surface (or a front surface) 200A, a second surface (or a rear surface) 200C, and a third surface (or a side surface) 200B surrounding a space between the first surface 200A and the second surface 200C. In an embodiment, the housing 230 may refer to a structure (e.g., a frame structure 240 of FIG. 3) forming at least a portion of the first surface 200A, the second surface 200C, and/or the third surface 200B.

The electronic device 200 according to an embodiment may include a substantially transparent front plate 202. In an embodiment, the front plate 202 may form at least a portion of the first surface 200A. In an embodiment, the front plate 202 may include, for example, a glass plate including various coating layers or a polymer plate, but is not limited thereto.

The electronic device 200 according to an embodiment may include a substantially opaque rear plate 211. In an embodiment, the rear plate 211 may form at least a portion of the second surface 200C. In an embodiment, the rear plate 211 may be formed of coated or colored glass, ceramic, polymer, metal (e.g., aluminum, stainless steel (STS), or magnesium), or a combination of at least two of the above materials.

The electronic device 200 according to an embodiment may include a side bezel structure (or side member) 218 (e.g., a side wall 241 of a frame structure 240 of FIG. 3). In an embodiment, the side bezel structure 218 may be coupled to the front plate 202 and/or the rear plate 211 to form at least a portion of the third surface 200B of the electronic device 200. For example, the side bezel structure 218 may form all of the third surface 200B of the electronic device 200, and for another example, the side bezel structure 218 may form the third surface 200B of the electronic device 200 together with the front plate 202 and/or the rear plate 211.

Unlike the illustrated embodiment, when the third surface 200B of the electronic device 200 is partially formed by the front plate 202 and/or the rear plate 211, the front plate 202 and/or the rear plate 211 may include a region that is bent from a periphery thereof toward the rear plate 211 and/or the front plate 202 and seamlessly extends. The extended region of the front plate 202 and/or the rear plate 211 may be positioned at both ends of, for example, a long edge of the electronic device 200, but is not limited to the above-described examples.

In an embodiment, the side bezel structure 218 may include a metal and/or a polymer. In an embodiment, the rear plate 211 and the side bezel structure 218 may be integrally formed and may include the same material (e.g., a metal material such as aluminum), but are not limited thereto. For example, the rear plate 211 and the side bezel structure 218 may be formed in separate configurations and/or may include different materials.

In an embodiment, the electronic device 200 may include at least one of a display 201, an audio module 203, 204, 207, a sensor module (not illustrated), a camera module 205, 212, 213, a key input device 217, a light emitting device (not illustrated), and/or a connector hole 208. In an embodiment, the electronic device 200 may omit at least one of the components (e.g., a key input device 217 or a light emitting device (not illustrated)), or may further include another component.

In an embodiment, the display 201 (e.g., a display module 160 of FIG. 1) may be visually exposed (e.g., visible. The terms "visually exposed", "exposed" and "visible" may be used interchangeably herein) through a substantial portion of the front plate 202. For example, at least a portion of the display 201 may be visible through the front plate 202 forming the first surface 200A. In an embodiment, the display 201 may be disposed on the rear surface of the front plate 202.

In an embodiment, the appearance of the display 201 may be formed substantially the same as the appearance of the front plate 202 adjacent to the display 201. In an embodiment, in order to expand the area in which the display 201 is visually exposed, the distance between the outside of the display 201 and the outside of the front plate 202 may be formed to be generally the same.

In an embodiment, the display 201 (or the first surface 200A of the electronic device 200) may include a screen display area 201A. In an embodiment, the display 201 may provide visual information to a user through the screen display area 201A. In the illustrated embodiment, when the first surface 200A is viewed from the front, it is illustrated that the screen display area 201A is spaced apart from the outside of the first surface 200A and is positioned inside the first surface 200A, but it is not limited thereto. In an embodiment, when the first surface 200A is viewed from the front, at least a portion of the periphery of the screen display area 201A may substantially coincide with the periphery of the first surface 200A (or the front plate 202).

In an embodiment, the screen display area 201A may include a sensing area 201B configured to obtain biometric information of a user. Here, the meaning of "the screen display area 201A includes the sensing area 201B" may be understood to refer, for example, to at least a portion of the sensing area 201B may be overlapping the screen display area 201A. For example, the sensing area 201B, like other areas of the screen display area 201A, may refer to an area in which visual information may be displayed by the display 201 and additionally biometric information (e.g., fingerprint) of a user may be obtained. In an embodiment, the sensing area 201B may be formed in the key input device 217.

In an embodiment, the display 201 may include an area in which the first camera module 205 (e.g., a camera module 180 of FIG. 1) is positioned. In an embodiment, an opening may be formed in the area of the display 201, and the first camera module 205 (e.g., a punch hole camera) may be at least partially disposed in the opening to face the first surface 200A. In this case, the screen display area 201A may surround at least a portion of the periphery of the opening. In an embodiment, the first camera module 205 (e.g., an under display camera (UDC)) may be disposed under the display 201 to overlap the area of the display 201. In this case, the display 201 may provide visual information to the user through the area, and additionally, the first camera module 205 may obtain an image corresponding to a direction facing the first surface 200A through the area of the display 201.

In an embodiment, the display 201 may be coupled to or disposed adjacent to a touch sensing circuit, a pressure sensor capable of measuring the intensity (pressure) of the touch, and/or a digitizer that detects a magnetic field type stylus pen.

In an embodiment, the audio modules 203, 204 and 207 (e.g., an audio module 170 of FIG. 1) may include microphone holes 203 and 204 and a speaker hole 207.

In an embodiment, the microphone holes 203 and 204 may include a first microphone hole 203 formed in a partial area of the third surface 200B and a second microphone hole 204 formed in a partial area of the second surface 200C. A microphone (not illustrated) for obtaining an external sound may be disposed inside the microphone holes 203 and 204. The microphone may include a plurality of microphones to detect the direction of sound.

In an embodiment, the second microphone hole 204 formed in a partial area of the second surface 200C may be disposed adjacent to the camera modules 205, 212 and 213. For example, the second microphone hole 204 may obtain sound according to operations of the camera modules 205, 212, and 213. However, it is not limited thereto.

In an embodiment, the speaker hole 207 may include an external speaker hole 207 and a receiver hole (not illustrated) for a call. The external speaker hole 207 may be formed on a portion of the third surface 200B of the electronic device 200. In an embodiment, the external speaker hole 207 may be implemented as one hole with the microphone hole 203. Although not illustrated, a receiver hole (not illustrated) for a call may be formed on another portion of the third surface 200B. For example, the receiver hole for a call may be formed on the opposite side of the external speaker hole 207 on the third surface 200B. For example, based on the illustration of FIG. 2, the external speaker hole 207 may be formed on the third surface 200B corresponding to the lower end of the electronic device 200, and the receiver hole for a call may be formed on the third surface 200B corresponding to the upper end of the electronic device 200. However, the present disclosure is not limited thereto, and in an embodiment, the receiver hole for a call may be formed at a position other than the third surface 200B. For example, the receiver hole for a call may be formed by a space spaced apart between the front plate 202 (or display 201) and the side bezel structure 218.

In an embodiment, the electronic device 200 may include at least one speaker (not illustrated) configured to output sound to the outside of the housing 230 through an external speaker hole 207 and/or a receiver hole (not illustrated) for a call.

In an embodiment, the sensor module (not illustrated) (e.g., a sensor module 176 of FIG. 1) may generate an electrical signal or data value corresponding to an internal operating state or an external environmental state of the electronic device 200. For example, the sensor module may include at least one of a proximity sensor, an HRM sensor, a fingerprint sensor, a gesture sensor, a gyro sensor, a pressure sensor, a magnetic sensor, an acceleration sensor, a grip sensor, a color sensor, an infrared (IR) sensor, a biometric sensor, a temperature sensor, a humidity sensor, and an illumination sensor.

In an embodiment, the camera modules 205, 212 and 213 (e.g., a camera module 180 of FIG. 1) may include a first camera module 205 disposed to face the first surface 200A of the electronic device 200, a second camera module 212 disposed to face the second surface 200C, and a flash 213.

In an embodiment, the second camera module 212 may include a plurality of cameras (e.g., a dual camera, a triple camera, or a quad camera). However, the second camera module 212 is not necessarily limited to including a plurality of cameras, and may include one camera.

In an embodiment, the first camera module 205 and the second camera module 212 may include one or a plurality of lenses, an image sensor, and/or an image signal processor.

In an embodiment, the flash 213 may include, for example, a light emitting diode or a xenon lamp. In an embodiment, two or more lenses (infrared camera, wide-angle and telephoto lens) and image sensors may be disposed on one side of electronic device 200.

In an embodiment, the key input device 217 (e.g., an input module 150 of FIG. 1) may be disposed on the third surface 200B of the electronic device 200. In an embodiment, the electronic device 200 may not include some or all of the key input devices 217, and the not included key input device 217 may be implemented on the display 201 in another form such as a soft key.

In an embodiment, the connector hole 208 may be formed on the third surface 200B of the electronic device 200 to accommodate the connector of the external device. A connection terminal (e.g., a connection terminal 178 of FIG. 1) electrically connected to the connector of the external device may be disposed in the connector hole 208. The electronic device 200 according to an embodiment may include an interface module (e.g., an interface 177 of FIG. 1) for processing electrical signals transmitted and received through the connection terminal.

In an embodiment, the electronic device 200 may include a light emitting device (not illustrated). For example, the light emitting device (not illustrated) may be disposed on the first surface 200A of the housing 230. The light emitting device (not illustrated) may provide state information of the electronic device 200 in a form of light. In an embodiment, the light emitting device (not illustrated) may provide a light source when the first camera module 205 is operated. For example, the light emitting device (not illustrated) may include an LED, an IR LED, and/or a xenon lamp.

FIG. 3 is an exploded perspective view of an electronic device according to an embodiment.

Hereinafter, overlapping descriptions of components having the same reference numerals as those of the above-described components may not be repeated.

Referring to FIG. 3, the electronic device 200 according to an embodiment may include a frame structure 240, a first printed circuit board 250, a second printed circuit board 252, a cover plate 260, and a battery 270.

In an embodiment, the frame structure 240 may include a sidewall 241 forming an exterior (e.g., the third surface 200B of FIG. 2) of the electronic device 200 and a support portion 243 extending inward from the sidewall 241. In an embodiment, the frame structure 240 may be disposed between the display 201 and the rear plate 211. In an embodiment, the sidewall 241 of the frame structure 240 may surround a space between the rear plate 211 and the front plate 202 (and/or the display 201), and the support portion 243 of the frame structure 240 may extend from the sidewall 241 within the space.

In an embodiment, the frame structure 240 may support or accommodate other components included in the electronic device 200. For example, the display 201 may be disposed on one surface of the frame structure 240 facing one direction (e.g., the +z direction), and the display 201 may be supported by the support portion 243 of the frame structure 240. For another example, a first printed circuit board 250, a second printed circuit board 252, a battery 270, and a second camera module 212 may be disposed on the other surface facing a direction opposite to the one direction (e.g., the −z direction) of the frame structure 240. The first printed circuit board 250, the second printed circuit board 252, the battery 270, and the second camera module 212 may be mounted on a recess defined by the sidewall 241 and/or the support portion 243 of the frame structure 240.

In an embodiment, the first printed circuit board 250, the second printed circuit board 252, and the battery 270 may be coupled to the frame structure 240, respectively. For example, the first printed circuit board 250 and the second printed circuit board 252 may be fixedly disposed in the frame structure 240 through a coupling member such as a screw. For example, the battery 270 may be fixedly disposed on the frame structure 240 through an adhesive member (e.g., a double-sided tape). However, it is not limited by the above-described example.

In an embodiment, a cover plate 260 may be disposed between the first printed circuit board 250 and the rear plate 211. In an embodiment, the cover plate 260 may be disposed on the first printed circuit board 250. For example, the cover plate 260 may be disposed on a surface facing the −z direction of the first printed circuit board 250.

In an embodiment, the cover plate 260 may at least partially overlap the first printed circuit board 250 with respect to the z-axis. In an embodiment, the cover plate 260 may cover at least a partial area of the first printed circuit board 250. Through this, the cover plate 260 may protect the first printed circuit board 250 from physical impact or prevent and/or reduce the connector (e.g., a connector 34 of FIG. 3) coupled to the first printed circuit board 250 from being separated.

In an embodiment, the cover plate 260 may be fixedly disposed on the first printed circuit board 250 through a coupling member (e.g., a screw), or may be coupled to the frame structure 240 together with the first printed circuit board 250 through the coupling member.

In an embodiment, the display 201 may be disposed between the frame structure 240 and the front plate 202. For example, a front plate 202 may be disposed on one side (e.g., a +Z direction) of the display 201 and a frame structure 240 may be disposed on the other side (e.g., a −z direction).

In an embodiment, the front plate 202 may be coupled to the display 201. For example, the front plate 202 and the display 201 may adhere to each other through an optical adhesive member (e.g., optically clear adhesive (OCA) or optically clear resin (OCR)) interposed therebetween.

In an embodiment, the front plate 202 may be coupled to the frame structure 240. For example, the front plate 202 may include an outside portion extending outside the display 201 when viewed in the z-axis direction, and may adhere to the frame structure 240 through an adhesive member (e.g., a double-sided tape) disposed between the outside portion of the front plate 202 and the frame structure 240 (e.g., the sidewall 241). However, it is not limited by the above-described example.

In an embodiment, the first printed circuit board 250 and/or the second printed circuit board 252 may be equipped with a processor (e.g., a processor 120 of FIG. 1), a memory (e.g., a memory 130 of FIG. 1), and/or an interface (e.g., an interface 177 of FIG. 1). The processor may include, for example, one or more of a central processing unit, an application processor, a graphic processing unit, an image signal processor, a sensor hub processor, or a communication processor. The memory may include, for example, a volatile memory or a nonvolatile memory. The interface may include, for example, a high definition multimedia interface (HDMI), a universal serial bus (USB) interface, an SD card interface, and/or an audio interface. The interface may electrically or physically connect the electronic device 200 to an external electronic device, and may include a USB connector, an SD card/MMC connector, or an audio connector. In an embodiment, the first printed circuit board 250 and the second printed circuit board 252 may be operatively or electrically connected to each other through a connection member (e.g., a flexible printed circuit board).

In an embodiment, the battery 270 may supply power to at least one component of the electronic device 200. For example, the battery 270 may include a rechargeable secondary cell or a fuel cell. At least a portion of the battery 270 may be disposed on substantially the same plane as the first printed circuit board 250 and/or the second printed circuit board 252.

The electronic device 200 according to an embodiment may include an antenna module (not illustrated) (e.g., an antenna module 197 of FIG. 1). In an embodiment, the antenna module may be disposed between the rear plate 211 and the battery 270. The antenna module may include, for example, a near field communication (NFC) antenna, a wireless charging antenna, and/or a magnetic secure transmission (MST) antenna. The antenna module, for example, may perform short-range communication with an external device, or wirelessly transmit and receive power to and from the external device.

In an embodiment, the first camera module 205 (e.g., a front camera) may be disposed in at least a portion (e.g., a support portion 243) of the frame structure 240 so that the lens may receive external light through a partial area (e.g., a camera area 137 of FIG. 2) of the front plate 202.

In an embodiment, the second camera module 212 (e.g., a rear camera) may be disposed between the frame structure 240 and the rear plate 211. In an embodiment, the second camera module 212 may be electrically connected to the first printed circuit board 250 through a connection member (e.g., a connector). In an embodiment, the second camera module 212 may be disposed such that the lens may receive external light through a camera area 284 of the rear plate 211 of the electronic device 200.

In an embodiment, the camera area 284 may be formed on the surface (e.g., a rear surface 200C of FIG. 2) of the rear plate 211. In an embodiment, the camera area 284 may be formed to be at least partially transparent so that external light may be incident to the lens of the second camera module 212. In an embodiment, at least a portion of the camera area 284 may protrude from the surface of the rear plate 211 to a predetermined height. However, it is not limited to thereto, and in an embodiment, the camera area 284 may form a plane substantially the same as the surface of the rear plate 211.

In an embodiment, the housing 230 of the electronic device 200 may refer, for example, to a configuration or structure forming at least a portion of the exterior of the electronic device 200. In this regard, at least a portion of the front plate 202, the frame structure 240, and/or the rear plate 211 forming the exterior of the electronic device 200 may be referred to as the housing 230 of the electronic device 200.

Figure 4:
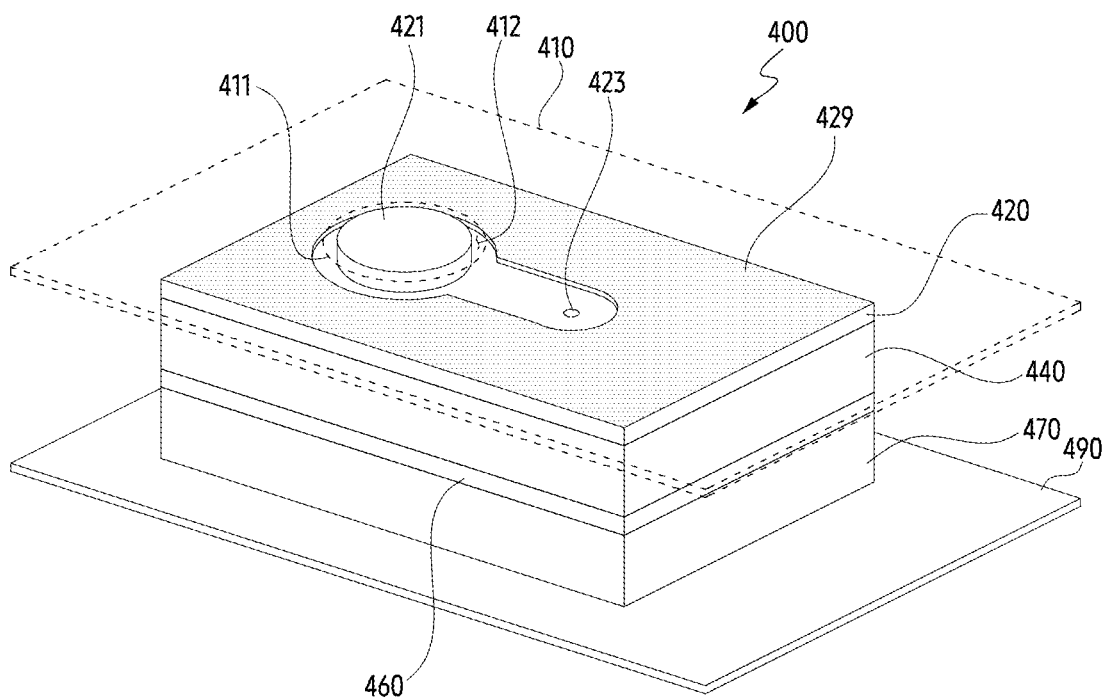
FIG. 4 is a perspective view illustrating a disposition of a flash module of an electronic device according to an embodiment.
Figure 5:
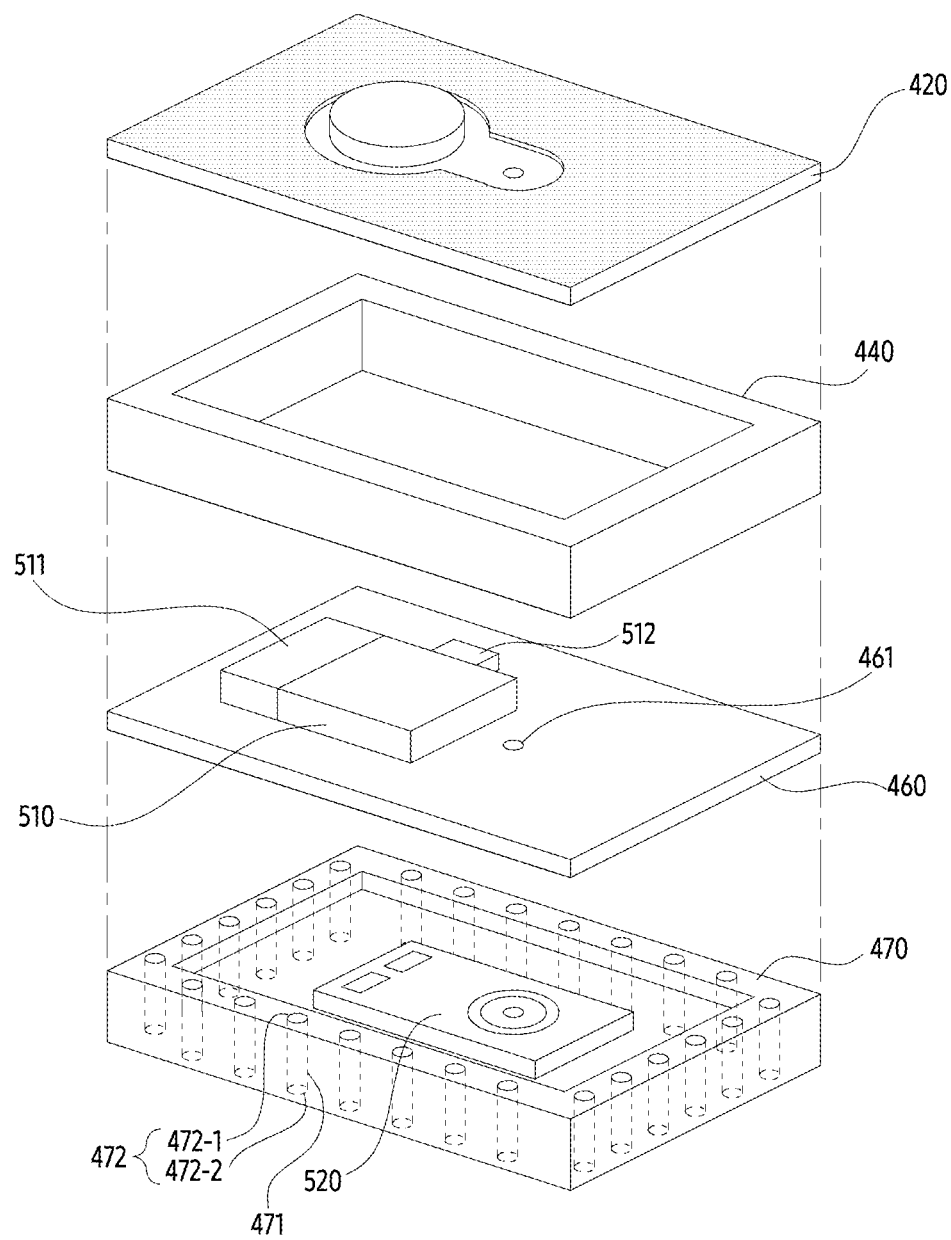
FIG. 5 is an exploded perspective view of a module including a flash module and a microphone of an electronic device according to an embodiment.

FIG. 4 is a perspective view illustrating a disposition of a flash module and a module including a microphone of an electronic device according to an embodiment. FIG. 5 is an exploded perspective view of a module including a flash module and a microphone of an electronic device according to an embodiment.

FIGS. 4 and 5 are perspective views and exploded perspective views illustrating an area P of the electronic device 200 illustrated in FIG. 2. Referring to FIGS. 4 and 5, an electronic device 400 (e.g., an electronic device 101 of FIG. 1 or an electronic device 200 of FIG. 2) may include a housing 410, a plate 420 including a transparent portion, a first board 490, a sidewall structure 470, a second board 460, a sidewall structure 470, a flash module 510, and/or a microphone 520.

According to an embodiment, the housing 410 may form the exterior of the electronic device 400. The illustrated housing 410 may be a rear plate (e.g., the rear plate 211 of FIG. 2) including an opening through which the camera and/or the flash module 510 is exposed. For example, the housing 410 may include a first opening 411 that transmits light emitted from the flash module 510 to the outside. The first opening 411 may be aligned with a light axis of the flash module 510 to transmit light emitted from the flash module 510 to the outside.

According to an embodiment, the transparent portion of the plate 420 may be disposed in a path of light emitted from the flash module 510. For example, the plate 420 including a transparent portion may include a protruding portion 421 inserted into the first opening 411. The protruding portion 421 inserted into the first opening 411 may be exposed to the outside of the housing 410. Light emitted from the flash module 510 aligned with the first opening 411 may pass through the protruding portion 421 and transmit light to the outside. The plate 420 including a transparent portion may include a glass plate or a polymer plate capable of transmitting light. However, it is not limited thereto. The protruding portion 421 may be formed in a shape corresponding to the first opening 411. For example, the protruding portion 421 protruding from one surface of the plate 420 facing the first opening 411 may be formed to maintain a constant distance between the first opening 411 and the protruding portion 421. When the first opening 411 and the protruding portion 421 are formed in a circular shape, the diameter of the first opening 411 may be larger than the diameter of the protruding portion 421. A gap 412 between the first opening 411 and the protruding portion 421 may be a space between the small-diameter protruding portion 421 and the first opening 411. The gap 412 between the first opening 411 and the protruding portion 421 may be used as a portion of an audio signal path transmitted from the outside of the electronic device 400. Light emitted from the flash module 510 may pass through the protruding portion 421, and the gap 412 between the first opening 411 and the protruding portion 421 may be a partial area of a path through which an audio signal passes.

According to an embodiment, the plate 420 including the transparent portion may include a second opening 423 penetrating the other surface opposite to the one surface of the plate 420 including the transparent portion from one surface of the plate 420 including the transparent portion. The second opening 423 may be connected to a space surrounded by the sealing member 440. The audio signal passing through the gap 412 between the first opening 411 and the protruding portion 421 from the outside of the electronic device 400 may be transmitted to the space in the sealing member 440 through the second opening 423. The gap 412 and the second opening 423 may be portion of an audio path formed from the outside of the electronic device to the inside of the electronic device.

According to an embodiment, the electronic device 400 may include an adhesive member 429 that attaches the plate 420 including a transparent portion to the housing 410. The adhesive member 429 may be disposed between the housing 410 and the plate 420 including a transparent portion. The adhesive member 429 may be applied to a portion of the plate 420 including the transparent portion, except for an area including the protruding portion 421 and the second opening 423 of the plate 420 including the transparent portion. The plate 420 including a transparent portion may be attached to the housing 410 by an adhesive member 429. The protruding portion 421 of the plate 420 including the transparent portion may be exposed to the outside by being at least partially inserted into the first opening 411.

According to an embodiment, the electronic device 400 may further include a sealing member 440. The sealing member 440 may prevent/reduce light emitted from the flash module 510 from leaking into an internal space of the electronic device 400, and may prevent/reduce the audio signal transmitted to the microphone 520 from leaking inside the electronic device 400. The sealing member 440 may reduce the loss of the audio signal transmitted through the gap 412 and the second opening 423. The sealing member 440 may guide the audio signal to pass through the through hole 461 and be transmitted to the microphone 520.

According to an embodiment, the housing 410 may form an exterior of the electronic device 400 and may form a closed curved surface. The first board 490 may be disposed in an internal space of the housing 410. The first board 490 (e.g., the first printed circuit board 250 or the second printed circuit board 252 of FIG. 3) may be electrically connected to the flash module 510 and the microphone 520. For example, the first board 490 may be electrically connected to the flash module 510 and the microphone 520 through the sidewall structure 470 and the second board 460. The first board 490 may be referred to as a printed circuit board.

According to an embodiment, the sidewall structure 470 may be disposed on the first board 490. The sidewall structure 470 may be disposed between the first board 490 and the second board 460 in order to electrically connect the first board 490 and the second board 460, and the sidewall structure 470 may be an interposer including a conductive via 471 and conductive pads 472 whose ends are in contact with the first board 490 and the second board 460. The conductive via 471 may be accommodated in a via hole formed in the sidewall structure 470 which is an interposer. The conductive pads 472 may be disposed at an end of the conductive via 471. The conductive via 471 and the conductive pad 472 may electrically connect the first board 490 and the second board 460. The sidewall structure 470 may be disposed along periphery of the second board 460. The sidewall structure 470 may include one surface in contact with the first board 490 and the other surface opposite to the one surface and contacting the second board 460. Each of the conductive vias 471 may extend from one surface of the sidewall structure 470 to the other surface of the sidewall structure 470. Each of the conductive pads 472 disposed at both ends of the conductive via 471 may contact the pad of the first board 490 and the pad of the second board 460. For example, the conductive pad 472-1 disposed at one end of the conductive via 471 may be connected to one of the pads of the second board 460, and the conductive pad 472-2 disposed at the other end of the conductive via 471 may be connected to one of the pads of the first board 490.

According to an embodiment, the sidewall structure 470 may be formed of one member. According to an embodiment, the sidewall structure 470 may be formed of a plurality of members. For example, the sidewall structure 470 may be formed of a plurality of sidewall structures corresponding to periphery of the second board 460, respectively. The sidewall structure 470 may be disposed between the second board 460 and the first board 490 to reduce a distance between the flash module 510 disposed on the second board 460 and the plate 420 including a transparent portion. When the flash module 510 is mounted on the first board 490, a distance between the flash module 510 and the plate 420 including the transparent portion may be increased, and thus an emission angle of light emitted from the flash module 510 may be decreased. In order to increase the emission angle of the flash module 510 and the light emitted to the outside from the flash module 510, the sidewall structure 470 may separate the second board 460 on which the flash module 510 is disposed from the first board 490 by a designated distance, and may connect the flash module 510 to the first board 490. Regarding securing the emission angle of the flash module 510, it will be described in greater detail below with reference to FIG. 6.

According to an embodiment, the second board 460 may be disposed on the sidewall structure 470 to face the first board 490. The second board 460 may electrically connect the first board 490 through the sidewall structure 470. According to an embodiment, the second board 460 may include a through hole 461 for transmitting an audio signal to the microphone 520. The gap 412, the second opening 423, and the through hole 461 may form an audio path transmitted to the microphone 520. For example, the audio signal transmitted from the outside of the electronic device 400 may be transmitted to the inside of the electronic device 400 through a gap 412 between the first opening 411 and the protruding portion 421. The audio signal transmitted to the inside of the electronic device 400 may be transmitted to the second opening 423 through a space formed by the plate 420 including a transparent portion and the housing 410. The audio signal may be transmitted to a space surrounded by the sidewall structure 470, the plate 420 including the transparent portion, and the second printed circuit board 460 through the second opening 423. The audio signal transmitted to the space may be transmitted to the microphone 520 through a through hole 461 formed in the second printed circuit board 460.

According to an embodiment, the microphone 520 may be disposed on one surface (e.g., the first surface 460a of FIG. 7) of the second board 460 in a space surrounded through the first board 490, the second board 460, and the sidewall structure 470. The electronic device 400, when obtaining a video through the camera module, may obtain an audio signal through the microphone 520 disposed in a direction toward which a camera module (e.g., the camera modules 205, 211, and 213 of FIG. 2) faces. The electronic device 400, when performing noise cancelling, may obtain an audio signal transmitted from the surroundings through the microphone 520. In order for the microphone 520 to obtain an audio signal transmitted from the direction the camera module faces, the electronic device 400 may have a gap 412 formed in the direction the camera module faces. According to an embodiment, the electronic device 400 may use a gap 412 between the first opening 411 and the protruding portion 421 as a microphone hole.

According to an embodiment, the flash module 510 may be disposed on the other surface (e.g., the second surface 460b of FIG. 7) opposite to one surface of the second board 460. The flash module 510 may be disposed around the camera. The flash module 510 may emit light when an image is obtained through a camera in an environment in which illumination is relatively low. According to an embodiment, the flash module 510 may include a light emitting diode (LED) module. However, it is not limited thereto. The flash module 510 may provide light in a direction opposite to a direction in which the camera receives the light in order to obtain an image. According to an embodiment, the light provided by the flash module 510 may be white light. According to an embodiment, the electronic device 400 may further include a flicker sensor 511 and a diode 512 disposed on the second board 460. The electronic device 400 may detect flickering of an artificial light source through the flicker sensor 511. When obtaining an image through a camera, the electronic device 400 may reduce a flickering phenomenon using the flicker sensor 511.

According to an embodiment, the microphone 520 may share the second board 460 with the flash module 510. The second board 460 may be disposed between the microphone 520 and the flash module 510. The second board 460 may electrically disconnect the microphone 520 and the flash module 510, by including a conductive layer electrically connected to the grounding portion of the first board 490 therein.

According to an embodiment, the microphone 520 may be disposed to be in contact with one surface of the second board 460 in a space between the second board 460 and the first board 490. The flash module 510 may be disposed on the second board 460 in a space between the second board 460 and the plate 420 including a transparent portion. The second board 460 may electrically connect the microphone 520 and the flash module 510 to the first board 490. For example, the microphone 520 may be connected to the second board 460 through a pad exposed on one surface of the second board 460. The flash module 510 may be connected to the second board 460 through a pad exposed on the other side of the second board 460. The second board 460, by being electrically connected to the first board 490 through a conductive via 471 formed in the sidewall structure 470 that is an interposer, may electrically connect the flash module 510 and the microphone 520 to the first board 490.

According to the above-described example, the sidewall structure 470 formed to closely arrange the flash module 510 to the plate 420 including a transparent portion may surround an internal space together with the first board 490 and the second board 460. The microphone 520 may be disposed in the space, thereby reducing the mounting space of the microphone 520.

Figure 6:
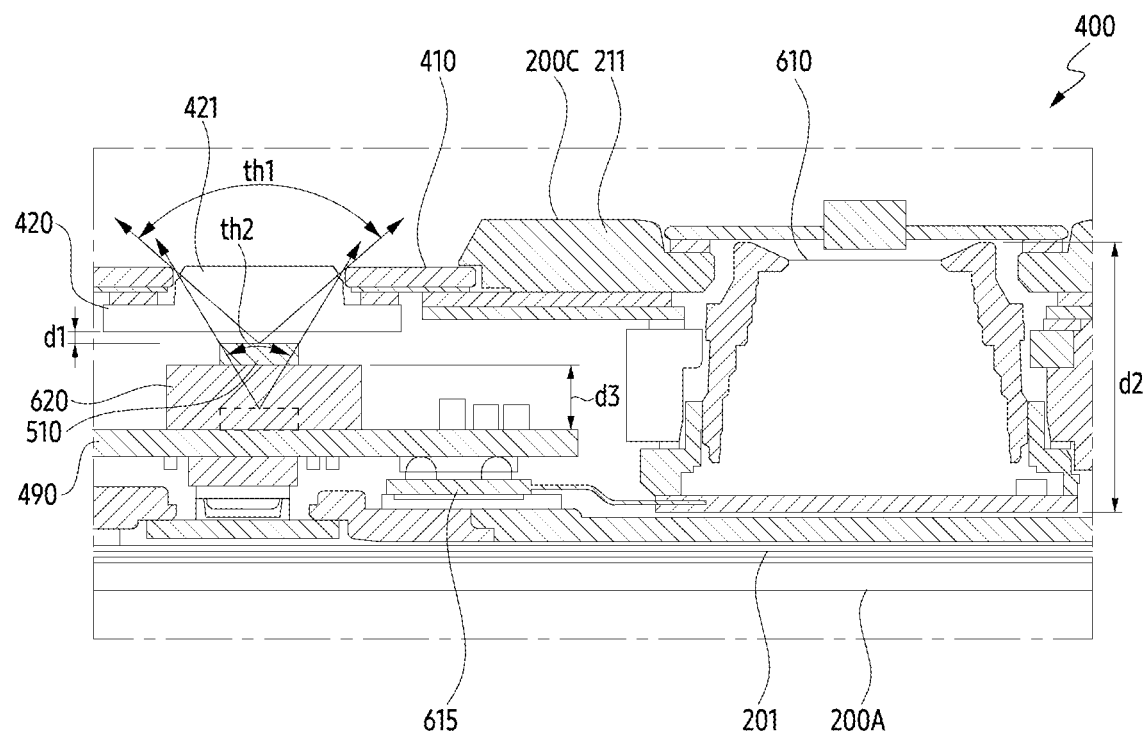
FIG. 6 is a partial cross-sectional view of the electronic device of FIG. 2 taken along line A-A according to an embodiment.
Figure 7:
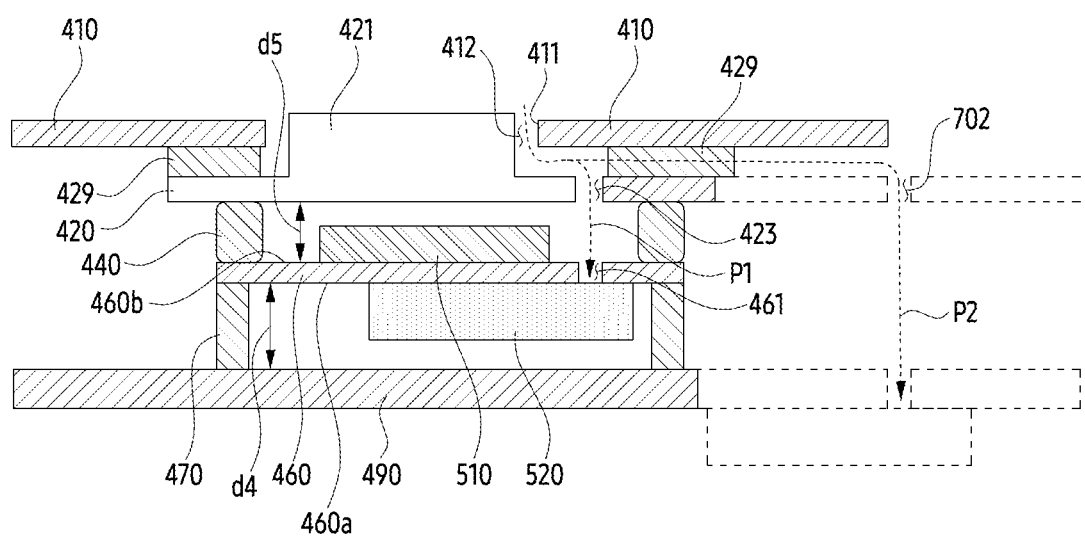
FIG. 7 is a partial cross-sectional view of the electronic device of FIG. 2 taken along line B-B according to an embodiment.

FIG. 6 is a partial cross-sectional view of the electronic device of FIG. 2 taken along line A-A according to an embodiment. FIG. 7 is a partial cross-sectional view of the electronic device of FIG. 2 taken along line B-B according to an embodiment.

Referring to FIG. 6, the electronic device 400 may include a display 201 forming a first surface 200A and a rear plate 211 forming a second surface 200C. The housing 410 may form an exterior of the electronic device 400. The housing 410 may be integrally formed with the rear plate 211 and may be coupled to the rear plate 211.

According to an embodiment, the electronic device 400 may further include a camera 610 (e.g., a camera module 212 of FIG. 2) and a flash module 510. The camera 610 may obtain an image by receiving external light. When the camera 610 may not obtain a clear image due to low illuminance of the external environment, the electronic device 400 may provide light to the outside through the flash module 510. The camera 610 may be connected to the first printed circuit board 490 through the connector 615, and may be electrically connected to a processor (e.g., a processor 120 of FIG. 1). The camera 610 may include a lens assembly including a plurality of lenses. The electronic device 400 may have a space corresponding to the height d2 of the camera 610 to provide a space for mounting the camera 610 of the electronic device 400. The height of the camera 610 may be related to the number of lenses of the lens assembly. Camera modules included in the electronic device 400 may include cameras that perform various functions such as a telephoto camera, a wide-angle camera, and an ultra-wide-angle camera. As the high-performance camera appears, the number of lenses composing the lens assembly increases, and the height d2 of the camera may increase by the increased number of lenses. Since the connector 615 of the camera 610 is connected to an image sensor disposed under the lens of the camera 610, a distance between the first board 490 and the rear plate 211 of the housing 410 may be related to a height d2 of the camera 610.

According to an embodiment, the height d2 of the camera 610 may be different from the distance d1 between the flash module 510 and the plate 420 including a transparent portion. In order to reduce the difference between the height d2 and the distance d1, the electronic device 400 may further include a gap compensation unit 620. Since the flash module 510 is disposed on the gap compensation unit 620, the flash module 510 may be disposed in an area close to the camera 610 among areas of the first board 490. The flash module 510 may be disposed at a position where the distance d1 between the flash module 510 and the plate 420 including the transparent portion is minimized/reduced. The flash module 510 disposed on the gap compensation unit 620 may be spaced apart from the first board 490 by a height d3 of the gap compensation unit 620. An emission angle th1 of light emitted from the flash module 510 may be determined by the distance d1 between a diameter of the protruding portion 421 of the plate 420 including the transparent portion and a plate 420 including a flash module 510 and a transparent portion. When the flash module 510 is directly disposed on the first board 490, a distance between the flash module 510 and the plate 420 including the transparent portion may be increased, and an emission angle th2 may be narrowed. The flash module 510 disposed on the gap compensation unit 620 may reduce a distance d1 between the flash module 510 and the plate 420 including a transparent portion by a height d3 of the gap compensation unit 620. The emission angle th1 of the flash module 510 disposed on the gap compensation unit 620 may be wider than the emission angle th2 of the flash module disposed on the first board 490 by reducing the distance d1 from the plate 420 including the transparent portion by the gap compensation unit 620.

According to an embodiment, the gap compensation unit 620 may be formed of a second board (e.g., the second board 460 of FIG. 4) and a sidewall structure (e.g., the sidewall structure 470 of FIG. 4). The gap compensation unit 620 may have an internal space surrounded by the second board 460 and the sidewall structure 470. An electronic component (e.g., a microphone) distinct from the flash module 510 may be disposed in an internal space of the gap compensation unit 620.

Referring to FIG. 7, the housing 410 may include the first opening 411. The protruding portion 421 corresponding to the transparent portion of the plate 420 may be inserted into the first opening 411. The plate 420 may be attached to the housing 410 by an adhesive member 429 spaced apart from a periphery of the protruding portion 421. The plate 420 including the transparent portion may include the second opening 423.

According to an embodiment, the second board 460 may be disposed between the plate 420 including the transparent portion and the first board 490. The microphone 520 may be disposed on a first surface 460a of the second board 460, and the flash module 510 may be disposed on a second surface 460b of the second board 460. The first surface 460a of the second board 460 may face the first board 490. The second surface 460b of the second board 460 may be a surface opposite to the first surface 460a. For example, the second surface 460b of the second board 460 may be a surface of the second board 460 facing the first surface 460a of the second board 460. The second surface 460b of the second board 460 may be a surface facing the plate 420 including the transparent portion. The second board 460 may include a through hole 461.

According to an embodiment, the electronic device 400 may further include a sealing member 440 disposed on the second surface 460b of the second board 460. The sealing member 440 may prevent/reduce leakage of light emitted from the flash module 510 and may prevent/reduce leakage of an audio signal transmitted to the microphone 520. The sealing member 440 may include a rubber material having elasticity. The sealing member 440 may be disposed between the second board 460 and the plate 420 including the transparent portion. The sealing member 440 may contact the second board 460 and the plate 420 including the transparent portion, and may form a space in which the flash module 510 is disposed together with the second board 460 and the plate 420 including the transparent portion. The height d4 of the sidewall structure 470 may be greater than or equal to the height d5 of the sealing member 440. In order to reduce the distance between the sidewall structure 470 and the plate 420 including the transparent portion, the height d4 of the sidewall structure 470 may be disposed to be increased. As the height d4 of the sidewall structure 470 increases, the height d5 of the sealing member 440 may decrease.

According to an embodiment, the microphone 520 disposed on the first surface 460a of the second board 460 may be disposed in a space formed by the first board 490, the second board 460 and the sidewall structure 470. The microphone 520 may be connected to the through hole 461 formed in the second board 460. For example, the through hole 461 may be connected to the audio receiver of the microphone 520.

According to an embodiment, through gap 412 between the first opening 411 and the protruding portion 421 of the plate 420 including the transparent portion, and the first audio path P1 formed along the second opening 423 and the through hole 461, the microphone 520 may receive an audio signal from the outside. When the plate 420 including the transparent portion is viewed from the outside, the microphone 520 may be disposed to overlap the gap 412, the second opening 423, and the through hole 461. When the microphone 520 is disposed under the first board 490 and is disposed at a position not overlapping the protruding portion 421 and the flash module 510, the second audio path P2 may be lengthened. The plate 420 including the transparent portion may extend to the position overlapping the microphone. The second audio path P2 may be longer than the first audio path P1 by the extended length of the plate 420. By disposing the microphone under the first board 490, the second audio path P2 from the opening 702 formed in the plate 420 including the transparent portion to the first board 490 may be longer than the first audio path P1 from the second opening 423 of the plate 420 including a transparent portion to the second board 460.

According to the above-described embodiment, the electronic device 400 may reduce the length of the audio path by disposing the microphone 520 to overlap the gap 412 between the protruding portion 421 and the first opening 411, the second opening 423, and the through hole 461. When the plate 420 including the transparent portion is viewed from above, since the microphone 520 is disposed to overlap the flash module 510, the electronic device 400 may provide a structure for securing a mounting space of the microphone 520 under the flash module 510. For example, since the microphone 520 is disposed in a space surrounded by the second board 460, the sidewall structure 470, and the first board 490 and the flash module 510 is disposed on the second board 460, the electronic device 400 may dispose the microphone 520 in a narrow space. The size of the plate 420 including the transparent portion may decrease as the distance between the microphone 520 and the flash module 510 closer.

Figure 8A:
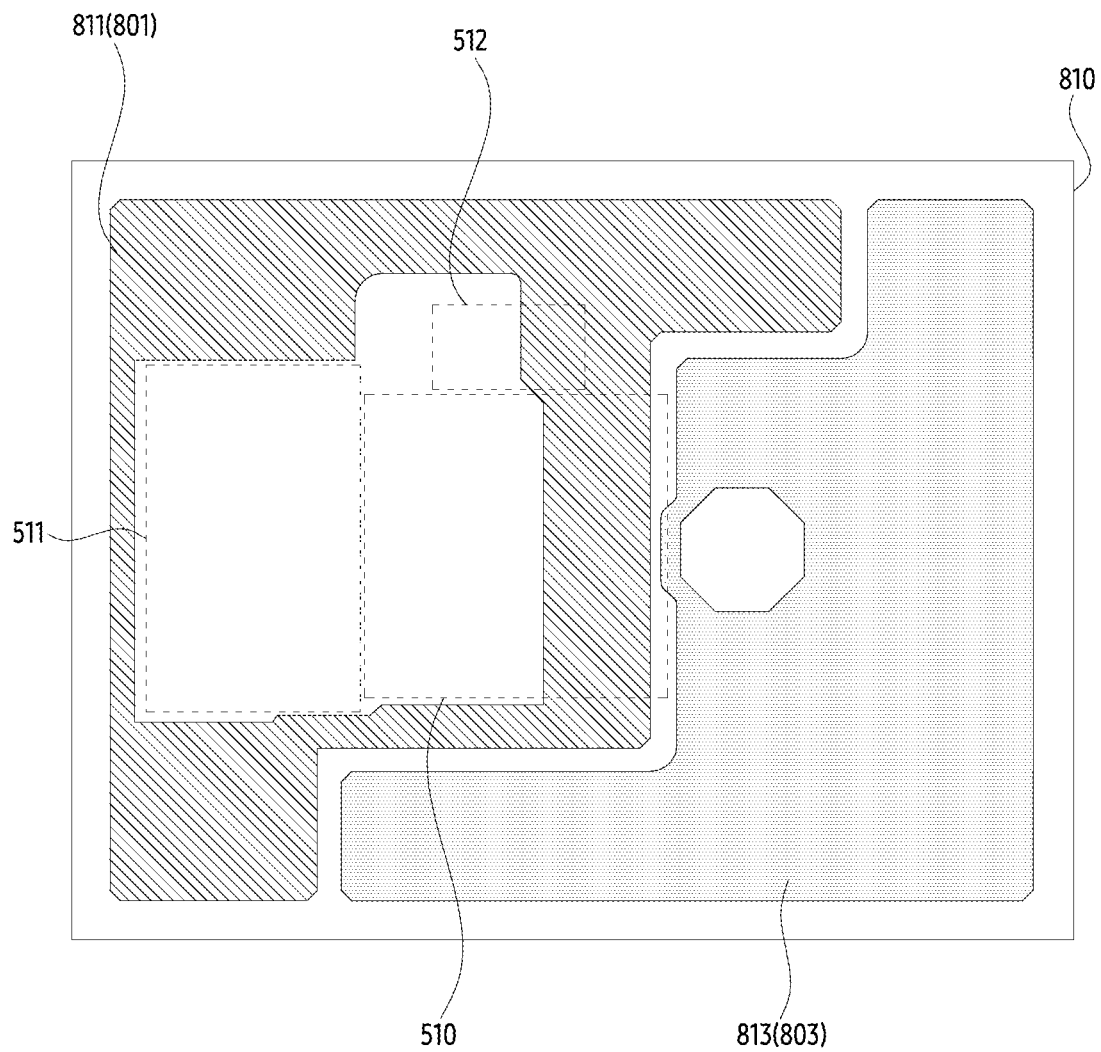
FIG. 8A is a diagram illustrating a top plan view of a first layer of a second printed circuit board of an electronic device, according to an embodiment.
Figure 8B:
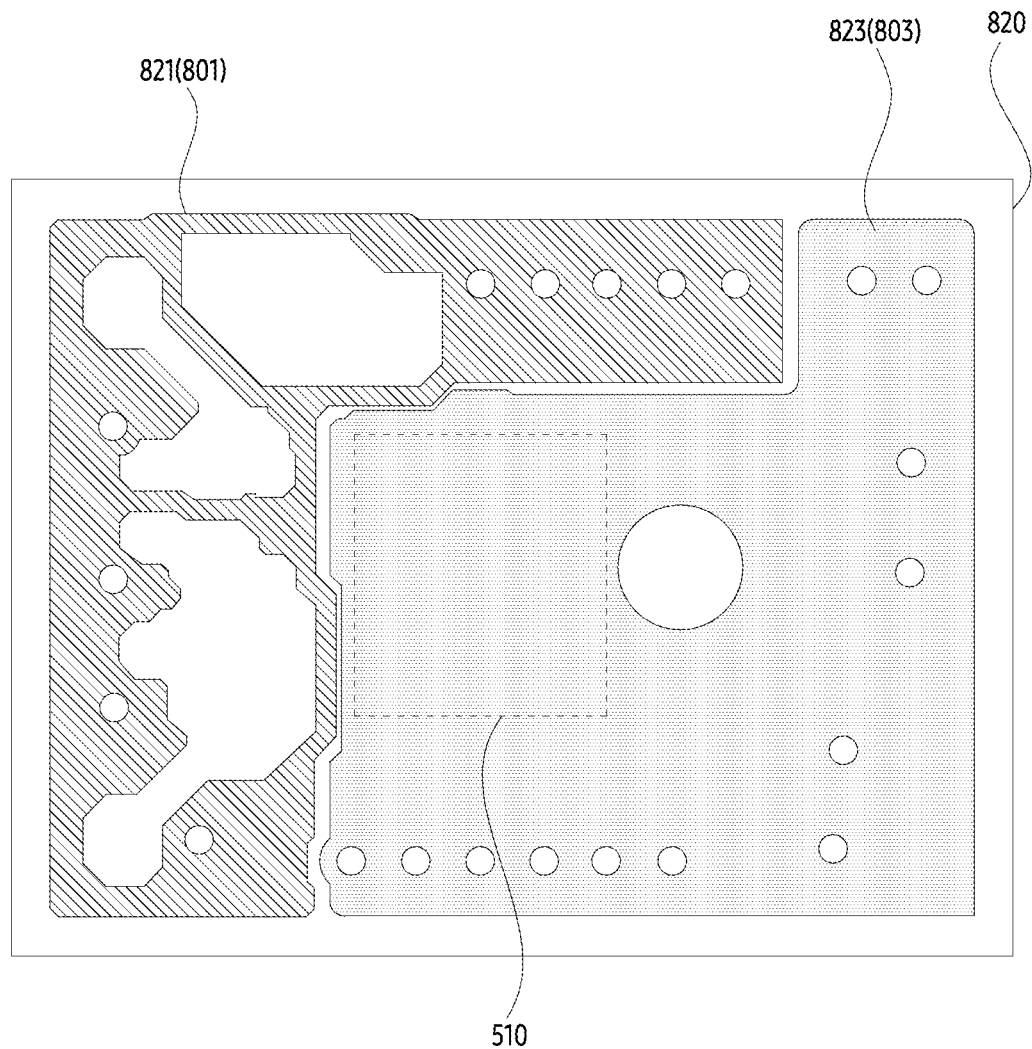
FIG. 8B is a diagram illustrating a top plan view of a second layer of a second printed circuit board of an electronic device, according to an embodiment.
Figure 8C:
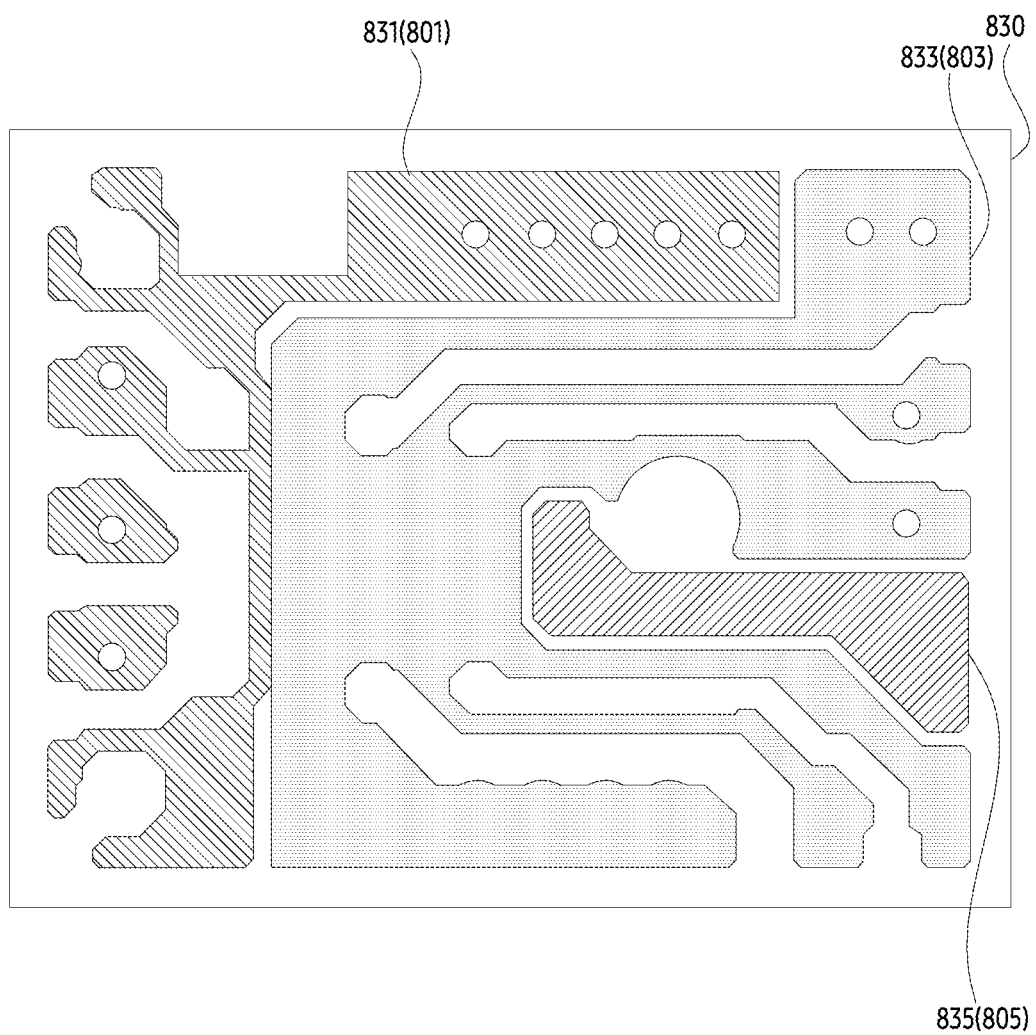
FIG. 8C is a diagram illustrating a top plan view of a third layer of a second printed circuit board of an electronic device, according to an embodiment.
Figure 8D:
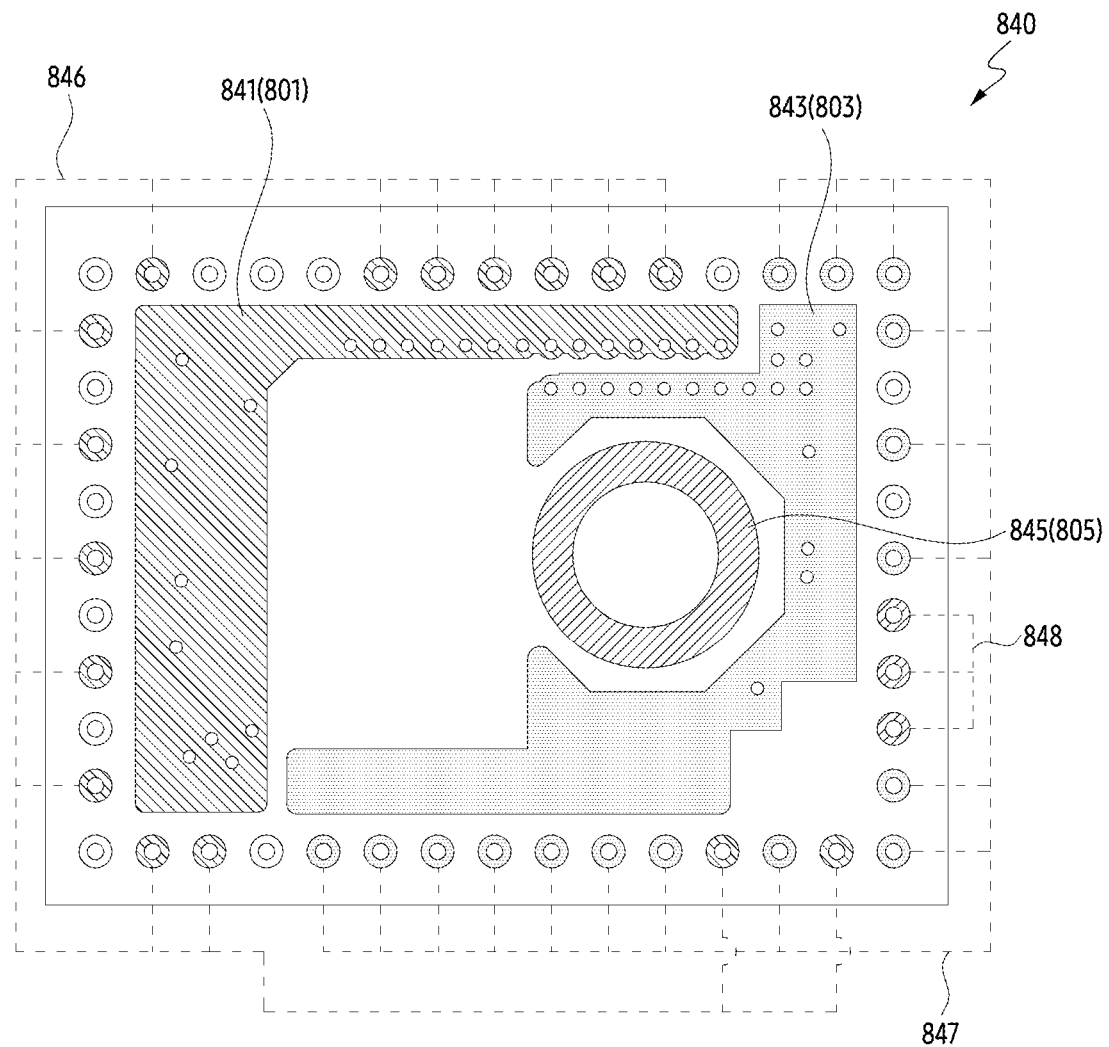
FIG. 8D is a diagram illustrating a top plan view of a fourth layer of a second printed circuit board of an electronic device, according to an embodiment.

FIG. 8A is a diagram illustrating a top plan view of a first layer of a second printed circuit board of an electronic device, according to an embodiment. FIG. 8B is diagram illustrating a top plan view of a second layer of a second printed circuit board of an electronic device, according to an embodiment. FIG. 8C is a diagram illustrating a top plan view of a third layer of a second printed circuit board of an electronic device, according to an embodiment. FIG. 8D is a diagram illustrating a top plan view of a fourth layer of a second printed circuit board of an electronic device, according to an embodiment.

Referring to FIGS. 8A, 8B, 8C, and 8D, a second board (e.g., a second board 460 of FIG. 4) may include a plurality of layers 810, 820, 830, and 840. Among the plurality of layers 810, 820, 830, and 840, the first layer 810 may form a second surface (e.g., a second surface 460b of FIG. 7) of a second board 460, and the fourth layer 840 may form a first surface (e.g., a first surface 460a of FIG. 7) of the second board 460. For example, a flash module 510, a flicker sensor 511 and/or a diode 512 may be disposed on the first layer 810. A microphone 520 may be disposed on the fourth layer 840.

According to an embodiment, the second board 460 may include the main grounding portion 803 electrically disconnecting the flash module 510 and the microphone 520 and electrically connecting the first board (e.g., the first board 490 of FIG. 4), the flash grounding portion 801 electrically disconnecting the main 803 grounding portion and electrically connecting the flash module 510, and a microphone grounding portion 805 electrically disconnecting the main grounding portion 803 and the flash grounding portion 801 and electrically connecting the microphone 520.

According to an embodiment, the main grounding portion 803 may be disposed in the first layer 810, the second layer 820, the third layer 830, and the fourth layer 840. The main grounding portion 803 may be electrically coupled to the grounding area of the first board 490 and may be electrically disconnected from components (e.g., a flash module 510, a flicker sensor 511, a diode 512, and/or a microphone 520) disposed in a plurality of layers 810, 820, 830, and 840.

Referring to FIG. 8A, a first portion 813 of the main grounding portion 803 and a first portion 811 of the flash grounding portion 801 may be disposed on the first layer 810. The first layer 810 may be formed of a non-conductive material, and the grounding portions 801 and 803 disposed in the first layer 810 may be formed of a conductive material. On the first layer 810, the first portion 813 of the main grounding portion 803 and the first portion 811 of the flash grounding portion 801 may be disposed to be spaced apart from each other. The flash grounding portion 801 may be a grounding portion that serves to emit heat generated from the flash module 510 to the outside and is connected to the flash module 510. The flash module 510 may be connected to the first portion 811 of the flash grounding portion 801 to emit heat generated in the light emitting diode (LED) device. The flash grounding portion 801 and the main grounding portion 803 may be physically spaced apart from each other and may be electrically disconnected.

According to an embodiment, when the first layer 810 is viewed from above, the first portion 811 of the flash grounding portion 801 may be disposed to overlap a portion of the flash module 510, and the first portion 813 of the main grounding portion 803 may not overlap the flash module 510.

According to an embodiment, in order to increase heat emission efficiency of heat emitted from the flash module 510, the first layer 810 in which the flash module 510 is disposed may dispose a first portion 811 of the flash grounding portion 801 wider than the area illustrated in FIG. 8A. The first layer 810 may not include the main grounding portion 803, and only the first portion 811 of the flash grounding portion 801 may be disposed.

Referring to FIG. 8B, a second layer 820 may include a second portion 823 of the main grounding portion 803 and a second part 821 of the flash grounding portion 801. The second layer 820 may be formed of a non-conductive material, and the grounding portions 801 and 803 disposed in the second layer 820 may be formed of a conductive material. The second portion 821 of the flash grounding portion 801 disposed in the second layer 820 may be connected to the first portion 811 of the flash grounding portion 801 disposed in the first layer 810 through conductive via. The second portion 823 of the main grounding portion 803 disposed in the second layer 820 may be connected to the first portion 813 of the main grounding portion 803 disposed in the first layer 810 through conductive via.

According to an embodiment, the second portion 823 of the main grounding portion 803 may be spaced apart from the second portion 811 of the flash grounding portion 801 and may be electrically disconnected.

According to an embodiment, when the second layer 820 is viewed from above, the second portion 823 of the main grounding portion 803 disposed in the second layer 820 may overlap an area in which the flash module 510 is disposed. The main grounding portion 803 may be connected to the grounding portion of the first board 490 to prevent/reduce noise that may be generated by the flash module 510 from being transmitted to the microphone 520.

Referring to FIG. 8C, a third portion 833 of the main grounding portion 803, a third portion 831 of the flash grounding portion 801, and a first portion 835 of the microphone grounding portion 805 may be disposed in the third layer 830. The third layer 830 may be formed of a non-conductive material, and the grounding portions 801, 803, and 805 disposed in the third layer 830 may be formed of a conductive material. The third portion 831 of the flash grounding portion 801 disposed in the third layer 830 may be connected to the first portion 811 and the second portion 821 of the flash grounding portion 801 disposed in the first layer 810 and the second layer 820 through a conductive via. The third portion 833 of the main grounding portion 803 disposed in the third layer 830 may be connected to the first portion 813 and the second portion 823 of the main grounding portion 803 disposed in the first layer 810 and the second layer 820 through a conductive via.

According to an embodiment, the third portion 833 of the main grounding portion 803, the third portion 831 of the flash grounding portion 801, and the first portion 835 of the microphone grounding portion 805 may be spaced apart from each other. For example, the third portion 833 of the main grounding portion 803 may be spaced apart from the third portion 831 of the flash grounding portion 801 and may be electrically disconnected. The third portion 833 of the main grounding portion 803 may be spaced apart from the first portion 835 of the microphone grounding portion 805 and may be electrically disconnected. The third portion 831 of the flash grounding portion 801 may be spaced apart from the first portion 835 of the microphone grounding portion 805 and may be electrically disconnected.

Referring to FIG. 8D, a fourth portion 843 of the main grounding portion 803, a fourth portion 841 of the flash grounding portion 801, and a second portion 845 of the microphone grounding portion 805 may be disposed in the fourth layer 840. The first conductive pads 846 electrically connected to the flash grounding portion 801, the second conductive pads 847 electrically connected to the main grounding portion 803, and the third conductive pads 848 electrically connected to the microphone grounding portion 805 may be exposed to the outside through the fourth layer 840. The first conductive pads 846, the second conductive pads 847, and the third conductive pads 848 may be electrically connected to a third portion 831 of the flash grounding portion 801 of the third layer 830, a third portion 833 of the main grounding portion 803, and a first portion 835 of the microphone grounding portion 805. The first conductive pads 846, the second conductive pads 847, and the third conductive pads 848 may contact conductive vias (e.g., the conductive vias 471 of FIG. 5) exposed from a sidewall structure (e.g., the sidewall structure 470 of FIG. 4), which is an interposer disposed along the conductive pads 846, 847, and 848, and may be electrically connected to the first board 490. For example, at least one sidewall structure 470 may be an interposer including a plurality of conductive vias electrically connecting the first board 490 and the second board 460. The first conductive vias among the plurality of conductive vias may extend from the flash grounding portion 801 or the first conductive pads 846 to the first board 490 along the sidewall structure 470. Among the plurality of conductive vias, the second conductive vias distinct from the first conductive vias may extend from the main grounding portion 803 or the second conductive pads 847 to the first board 490. Among the plurality of conductive vias, the third conductive vias distinct from the first conductive vias and the second conductive vias may extend from the microphone grounding portion 805 or the third conductive pads 848 to the first printed circuit board.

According to an embodiment, the first conductive pads 846 may be disposed at a portion of a periphery of the fourth layer 840 along a fourth portion 841 of the flash grounding portion 801 disposed at the fourth layer 840. The first conductive pads 846 may be disposed more than the second conductive pads 847 and the third conductive pads 848. A plurality of first conductive pads 846 may efficiently transfer heat generated from the flash module 510 to the first board 490.

According to an embodiment, the fourth portion 841 of the flash grounding portion 801 disposed at the fourth layer 840 may be connected to the first portion 811, the second portion 821 and the third portion 831 of the flash grounding portion 801 disposed in the first layer 810, the second layer 820, and the third layer 830 through a conductive via. The fourth portion 843 of the main grounding portion 803 disposed at the fourth layer 840 may be connected to the first portion 813, the second portion 823 and the third portion 833 of the main grounding portion 803 disposed in the first layer 810, the second layer 820, and the third layer 830 through a conductive via. The second portion 845 of the microphone grounding portion 805 disposed in the fourth layer 840 may 5 be connected to the first portion 835 of the microphone grounding portion 805 disposed in the third layer 830 through conductive via.

According to an embodiment, a fourth portion 843 of the main grounding portion 803, a fourth portion 841 of the flash grounding portion 801, and a second portion 845 of the microphone grounding portion 805 may be spaced apart from each other on the fourth layer 840. For example, the fourth portion 843 of the main grounding portion 803 may be spaced apart from the fourth portion 841 of the flash grounding portion 801 and may be electrically disconnected. The fourth portion 843 of the main grounding portion 803 may be spaced apart from the second portion 845 of the microphone grounding portion 805 and may be electrically disconnected. The fourth portion 841 of the flash grounding portion 801 may be spaced apart from the second portion 845 of the microphone grounding portion 805 and may be electrically disconnected.

According to the above-described embodiment, the second board 460 may quickly transfer heat emitted from the flash module 510 to the conductive material of the first board 490 by letting the flash grounding portion 801, the main grounding portion 803, and the microphone grounding portion 805 spaced apart from each other, and by electrically disconnecting. The main grounding portion 803 of the second board 460 may be electrically disconnected from electronic components (e.g., a flash module, a microphone, or a flicker sensor) disposed on the second board 460 to prevent/reduce interference of electrical signals between the electronic components. The second board 460 may effectively dissipate heat by a plurality of grounding portions 801, 803, and 805 formed of metals formed on each of the plurality of layers 810, 820, 830, and 840.

Figure 9:
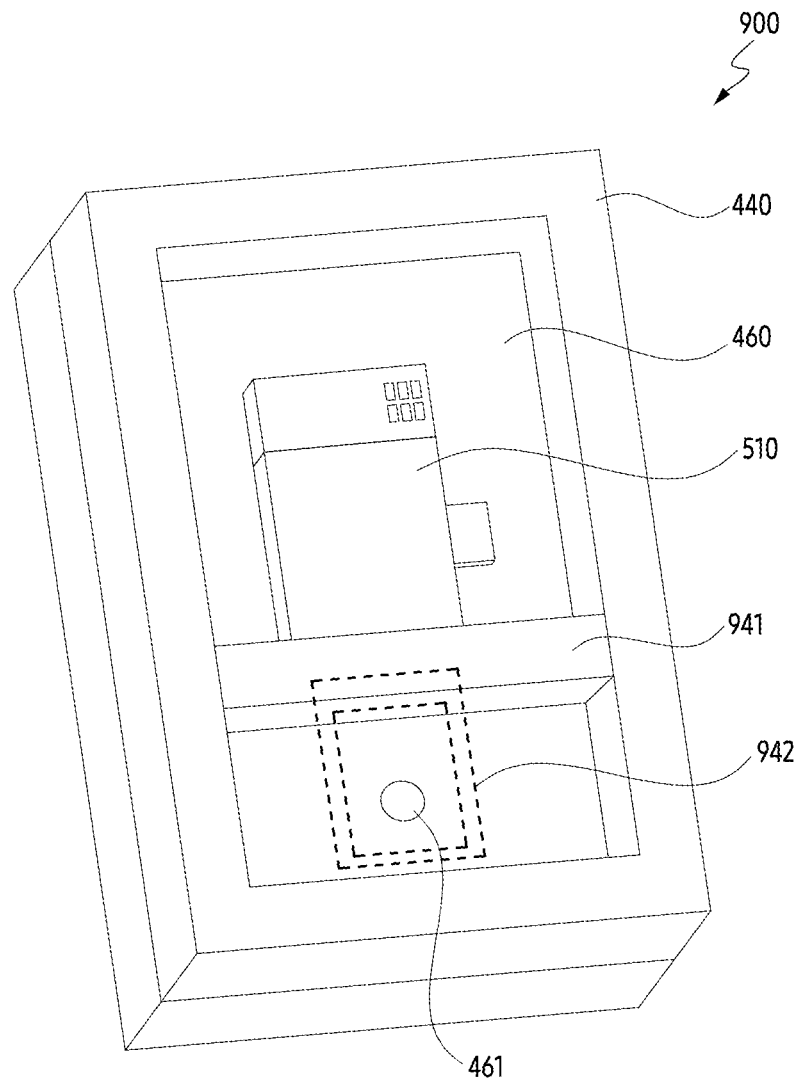
FIG. 9 is a perspective view illustrating a disposition of a module including a flash module and a microphone of a device and an additional sealing member according to an embodiment.
Figure 10:
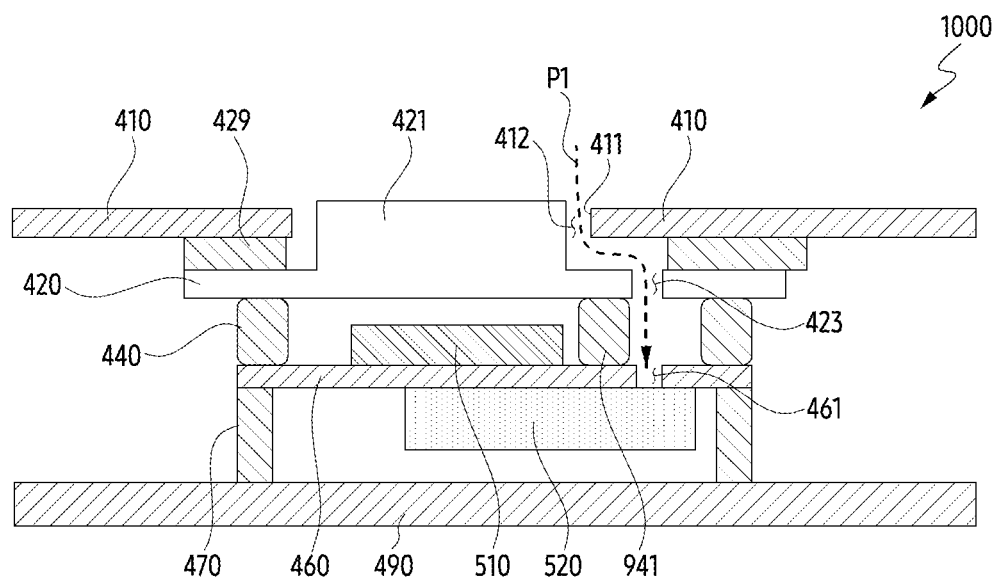
FIG. 10 is a cross-sectional view illustrating an example of an audio path of an electronic device including an additional sealing member according to an embodiment.
Figure 11:
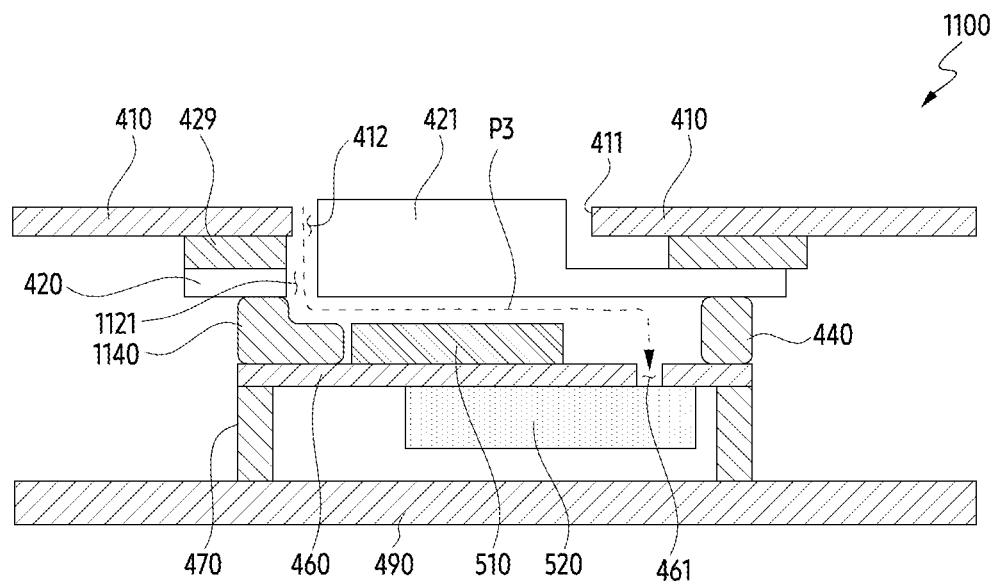
FIG. 11 is a cross-sectional view illustrating another example of an audio path according to an embodiment.

FIG. 9 is a perspective view illustrating a disposition of a module including a flash module and a microphone of a device and an additional sealing member according to an embodiment. FIG. 10 is a cross-sectional view illustrating an example of an audio path of an electronic device including an additional sealing member according to an embodiment. FIG. 11 is a cross-sectional view illustrating another example of an audio path according to an embodiment.

Referring to FIGS. 9 and 10, the microphone and flash module integration module 900 may have a structure similar to that of the gap compensation unit 620 of the microphone and flash module included in the electronic device (e.g., the electronic device 101 of FIG. 1, the electronic device 200 of FIG. 2, and/or the electronic device 400 of FIG. 4). The flash module 510 and the microphone 520 may be formed as one integration module 900. According to an embodiment, each of the separate flash module 510 and the microphone 520 may be disposed on both surfaces of the second board 460, respectively. For example, the flash module 510 may be disposed on a surface facing the plate 420 including a transparent portion of the second board 460, and the microphone 520 may be disposed on a surface facing the first board 490 of the second board 460.

According to an embodiment, a sealing member 440 may further include an additional sealing member 941. The additional sealing member 941 may be disposed to be spaced apart from a through hole 461 in order to address an asymmetry of the audio transmitted to the through hole 461. The sealing member 440 may be disposed along periphery of the second board 460. The through hole 461 may be disposed to be spaced apart from the flash module 510. The additional sealing member 941 may be disposed between the through hole 461 and the flash module 510. The additional sealing member 941 disposed between the through hole 461 and the flash module 510 may connect parallel peripheries of the sealing member 440. The additional sealing member 941 may divide a space in which the through hole 461 and the flash module 510 are disposed.

According to an embodiment, the distance from the additional sealing member 941 to the through hole 461 may be substantially the same as the distance from the through hole 461 to the periphery closer to the through hole 461 than the flash module 510. However, it is not limited thereto, and the through hole 461 may be disposed in an area surrounded by the additional sealing member 941 and the sealing member 440. For another example, the additional sealing member 941 may be disposed along the area 942 surrounding the through hole 461 on the second board 460. The additional sealing member 941 disposed in the area 942 may be a separate sealing member surrounding the through hole 461 or may be formed integrally with the sealing member 440. The additional sealing member 941 disposed in the area 942 may be a polygon having at least three peripheries spaced apart from the through hole 461 by the same distance. However, it is not limited thereto, the additional sealing member 941 disposed in the area 942 may be a circular shape having concentric with the through hole 461.

Referring to FIGS. 10 and 11, the electronic device 1000 may have a configuration similar to that of the electronic device of FIG. 7.

According to an embodiment, the electronic device 1000 may include the housing 410, the plate 420 including a transparent portion having a protruding portion 421 inserted into the first opening 411 formed in the housing 410, the first board 490, the sidewall structure 470 disposed on the first board 490, the second board 460 disposed on the sidewall structure 470, the flash module 510 disposed on the second board 460 between the second board 460 and the plate 420 including a transparent portion, and the flash module 510 disposed on the second board 460 in a space surrounded by the second board 460, the first board 490, and the sidewall structure 470.

According to an embodiment, the plate 420 including a transparent portion may be attached to the housing 410 by an adhesive member 429. The sealing member 440 may be disposed along the periphery of the second board 460.

Referring to FIG. 10, the audio path P1 may be formed along a gap 412 between the first opening 411 and the protruding portion 421 of the plate 420 including a transparent portion, and a second opening 423 and a through hole 461 of the plate 420 including the transparent portion. The audio signal transmitted from the outside of the electronic device may be transmitted to the microphone 520 along the audio path P1. To maintain the symmetry of the audio signal transmitted along the audio path P1, the electronic device 1000 may include an additional sealing member 941. For example, when the audio signal passing through the second opening 423 along the audio path P1 passes through a space between the second board 460, the sidewall structure 470, and the plate 420 including the transparent portion, the space in which the flash module 510 is positioned and the space in which the sealing member 440 is positioned may be asymmetric to each other. Asymmetry may refer to a situation in which an audio signal transmitted along the audio path may be leaked outside the audio path. In order to prevent/reduce distortion of the audio signal transmitted to the microphone, it is necessary to resolve the asymmetry of the audio path P1. According to an embodiment, the additional sealing member 941 may be spaced apart from the through hole 461 to resolve the asymmetry of the audio path P1 in the space between the second board 460, the sidewall structure 470, and the plate 420 including the transparent portion, the additional sealing member 941 may be disposed between the through hole 461 and the flash module 510. The additional sealing member 941 may be disposed at a position of the second board 460 capable of reducing difference between a distance between the audio path P1 and the sealing member 440 and a distance between the audio path P1 and the additional sealing member 941. The additional sealing member 941 may prevent/reduce an audio signal from leaking into a space between the plate 420 including a transparent portion and the flash module 510, and distortion due to the audio signal reflected from the space between the plate 420 including the transparent portion and the flash module 510 may be prevented and/or reduced.

Referring to FIG. 11, the electronic device 1100 may transmit a voice from the outside to the microphone 520 along a modified audio path P3 similar to that of FIG. 10. According to an embodiment, the electronic device 1100 may provide the audio path P3 in which the asymmetry is resolved without disposing an additional sealing member (e.g., the additional sealing member 941 or the additional sealing member 942 of FIG. 9).

According to an embodiment, the audio path P3 may be a path extending to the through hole 461 along a gap 412 between the first opening 411 and the protruding portion 421 of the plate 420 including the transparent portion, and space between the flash module 510 and the plate 420 including the transparent portion. Since the audio signal transmitted into the electronic device 110 through between the first opening 411 and the plate 420 including the transparent portion proceeds along a space between the flash module 510 and the plate 420 including the transparent portion, asymmetry of the audio path P3 may be reduced.

According to an embodiment, in order to form the audio path P3, the second opening 1121 may be connected to the gap 412 between the protruding portion 421 and the housing 410, and the second opening 1121 may not overlap the through hole 461. For example, when the second board 460 is viewed from above, the second opening 1121 may be formed in one area of the plate 420 positioned within a predetermined distance from the periphery of the second board 460 facing the periphery of the second board 460 close to the through hole 461.

According to an embodiment, the sealing member 440 may be disposed along periphery of the second board 460. In order to guide the audio path P3, a portion 1140 of the sealing member 440 disposed in area contacted with a portion of a periphery of the second opening 1121 of the plate 420 including a transparent portion may extend toward a side surface of the flash module 510. A height of an area extending toward a side surface of the flash module 510 among a portion 1140 of the sealing member 440 may be the same as or similar to a height of the flash module 510. For example, a surface facing the audio path of area extending toward a side surface of the flash module 510 among a portion 1140 of the sealing member 440 and a surface facing the audio path P3 of the flash module 510 may be disposed on substantially the same plane. According to an embodiment, the sealing member 440 may be disposed along a periphery of the second board 460 and may fill a gap between the plate 420 including a transparent portion and the second board 460. For example, the sealing member 440 may be disposed on the second board 460 and may support the plate 420 including a transparent portion. Since the portion 1140 of the sealing member 440 extending from the area supporting the plate 420 including the transparent portion has a height corresponding to the height of the flash module 510, the portion 1140 of the sealing member 440 may have a gap portion.

According to an embodiment, when passing through the gap 412, the second opening 1121, the space between a portion 1140 of the sealing member 440 and the plate 420 including a transparent portion, and the space between the microphone 520 and the plate 420 including the transparent portion, the audio path P3 may prevent/reduce the audio signal from leaking in addition to the space in which the audio path P3 is formed. The second opening 1121 and a portion 1140 of the sealing member 440 may provide an audio path P3 for reducing a space in which an audio signal may be leaked and distortion of the audio signal due to reflection.

The audio signal transmitted to the space between the microphone 520 and the plate 420 including the transparent portion may reduce the loss of audio signals and may be transmitted to the microphone 520 through the through hole 461.

According to the above-described embodiment, the electronic device 1000 may reduce distortion due to leakage or reflection of an audio signal transmitted along an audio path by disposing an additional sealing member 941 or changing the position of the second opening 1121 formed in the plate 420 including the transparent portion. The microphone 520 may obtain an audio signal in which leakage or distortion in the audio path is reduced through the through hole 461.

Figure 12:
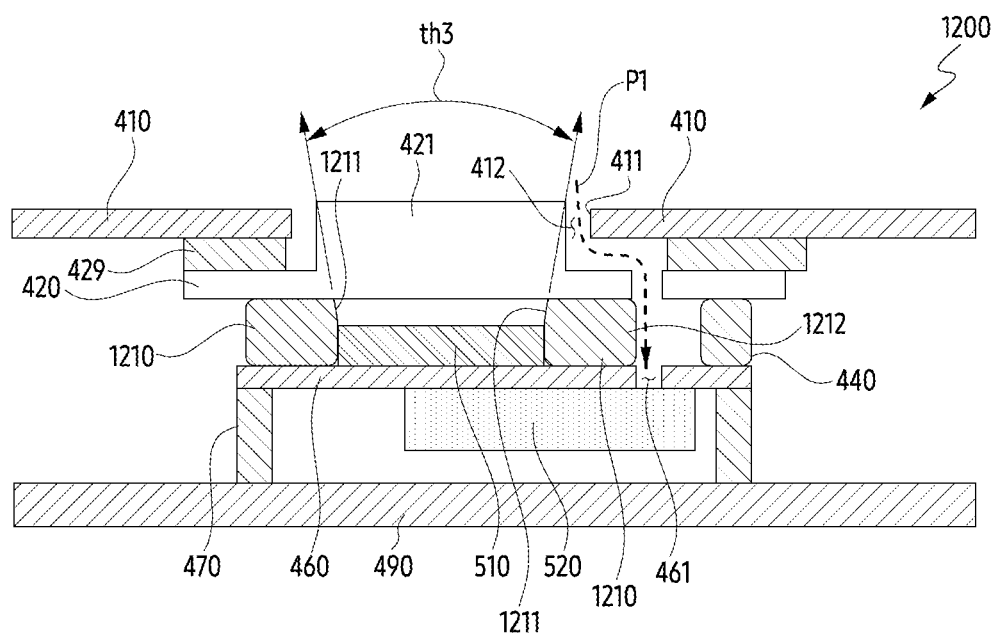
FIG. 12 is a cross-sectional view illustrating an example of a sealing member for securing an emission angle of a flash module according to an embodiment.
Figure 13:
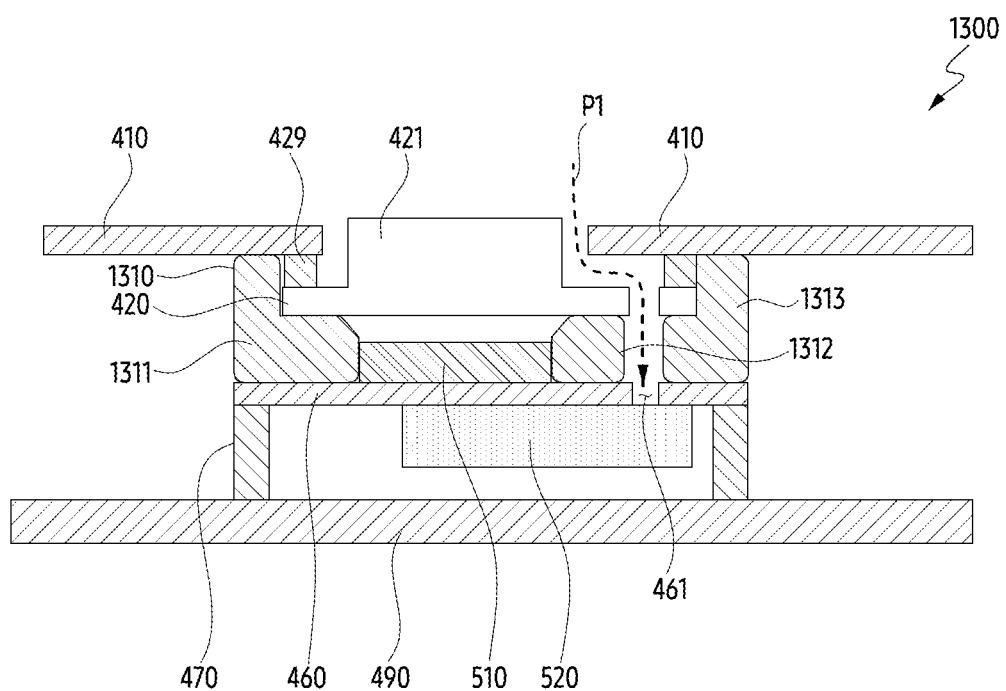
FIG. 13 is a cross-sectional view illustrating an example of a sealing member for emitting heat generated by a flash module according to an embodiment.

FIG. 12 is a cross-sectional view illustrating an example of a sealing member for securing an emission angle of a flash module according to an embodiment. FIG. 13 is a cross-sectional view illustrating an example of a sealing member for emitting heat generated by a flash module according to an embodiment.

Referring to FIGS. 12 and 13, the electronic device 1200, 1300 may have a configuration similar to that of the electronic device 400 of FIG. 7.

According to an embodiment, the electronic device 1200 may include the housing 410, the plate 420 including a transparent portion having a protruding portion 421 inserted into the first opening 411 formed in the housing 410, the first board 490, the sidewall structure 470 disposed on the first board 490, the second board 460 disposed on the sidewall structure 470, the flash module 510 and the second board 460 disposed on the second board 460 between the second board 460 and the plate 420 including the transparent portion, and the flash module 510 disposed on the second board 460 in a space surrounded by the first board 490 and the sidewall structure 470.

According to an embodiment, the plate 420 including a transparent portion may be attached to the housing 410 by an adhesive member 429. The sealing member 440 may be disposed along the periphery of the second board 460.

Referring to FIG. 12, the sealing member 440 may include sealing members 1210 and 1212 disposed along peripheries of the flash module 510. The sealing members 1210 and 1212 may be in contact with a side surface of the flash module 510. The sealing members 1210 and 1212 may include an inclined surface 1211 to widen the emission angle of the flash module 510. The sealing members 1210 and 1212 disposed in contact with the flash module 510 may limit a movement path of light emitted from the flash module. For example, when the sealing members 1210 and 1212 do not form an inclined surface, an area through which light emitted from the flash module 510 passes through the plate 420 including a transparent portion may be reduced. The electronic device 1200 may include sealing members 1210 and 1212 having an inclined surface 1211 for guiding a movement path of light emitted from the flash module 510 in order to supply light in a large area.

According to an embodiment, an area of an opening formed on a surface contacting the sealing members 1210 and 1212 and the second board 460 or a surface contacting the sealing members 1210 and 1212 and the flash module 510 may be narrower than an area of the opening formed on the surface in contact with the sealing members 1210 and 1212 and the plate 420 including the transparent portion. The inclined surfaces 1211 of the sealing members 1210 and 1212 may be formed to be the more toward the plate 420 including a transparent portion, the more far from the optical axis of light emitted from the flash module 510. For example, a height of an inner surface of the sealing members 1210 and 1212 may be lower than a height of an outer surface of the sealing members 1210 and 1212. The light emitted from the flash module 510 may be guided through the inclined surfaces 1211 of the sealing members 1210 and 1212 and may be emitted to the outside of the electronic device 1200 with an emission angle th3.

Referring to FIG. 13, the sealing member 440 may include a sealing member 1310 disposed along peripheries of the flash module 510. The sealing member 1310 may include sealing members 1311 and 1313 disposed along the peripheries of the second board 460, and sealing members 1312 disposed on the surface of the second board 460 and to divide the space between the second board 460 and the plate 420 including the transparent portion.

The sealing member 1312 may be disposed at a portion of a periphery of the through hole to prevent/reduce leakage of the audio signal transmitted along the audio path P1. The sealing members 1311 and 1312 may be in contact with the side surfaces of the flash module 510. While the flash module 510 emits light to the outside, heat may be generated from the flash module 510. The heat generated from the flash module 510 may be connected to a portion of the grounding portion of the second board 460 and emitted through conductive vias of the first board 490. The electronic device 1200 may further include an additional heat emission structure to efficiently emit heat generated from the flash module 510.

According to an embodiment, in order to dissipate heat emitted from the flash module 510, the first sealing member 1311 and the second sealing member 1312 may contact the side surface of the flash module 510 and may be disposed along the side surface of the flash module 510. According to an embodiment, the second sealing member 1312 may be referred to as the additional sealing member 941 of FIG. 9. The first sealing member 1311 and the second sealing member 1312 may prevent/reduce leakage of light emitted from the flash module 510 and secure the amount of light transmitted to the outside. The first sealing member 1311 may be in contact with a side surface of the flash module 510 and may be in contact with a portion of the housing 410. The housing 410 may be formed of a conductive material (e.g., metal), and may have high thermal conductivity. A portion of the heat emitted from the flash module 510 may transmit light to the outside of the housing 410 through the first sealing member 1311. The second sealing member 1312 may reduce light leakage together with the first sealing member 1311, and may reduce leakage of an audio signal transmitted to the microphone 520 together with the third sealing member 1313. The first sealing member 1311, the second sealing member 1312 and the third sealing member 1313 may be integrally formed.

According to an embodiment, the remaining portion of the heat emitted from the flash module 510 may be transferred to the second sealing member 1312. The heat transferred to the second sealing member 1312 may be transferred to the first sealing member 1311 and the third sealing member 1313 connected to the second sealing member 1312. The third sealing member 1313 is in contact with the housing 410, similarly to the first sealing member 1311, and may transmit heat to the housing. According to an embodiment, the heat transferred to the second sealing member 1312 may transfer heat to the housing 410 through the first sealing member 1311 and the third sealing member 1313.

According to an embodiment, the sealing member 1310 may be an elastic body made of a material having good thermal conductivity in order to secure heat dissipation performance. The sealing member 1310 may include a material having elasticity and thermal conductivity, such as thermally conductive silicon. The thermal conductivity of the sealing member 1310 may be approximately 1 to 9 (W/m*K). A compression ratio of the sealing member 1310 may be approximately 15% to 75%.

According to the above-described embodiment, the electronic device 1200 may increase the emission angle of the flash module 510 by placing an inclination on the surface of the sealing member in contact with the side surface of the flash module 510. The sealing member in contact with the flash module 510 may prevent/reduce light emitted from the flash module 510 from leaking.

According to an embodiment, the electronic device 1200 may emit heat transferred from the flash module 510 to the outside by disposing a sealing member to contact the housing 410 including a side surface of the flash module 510 and a conductive material.

Figure 14:
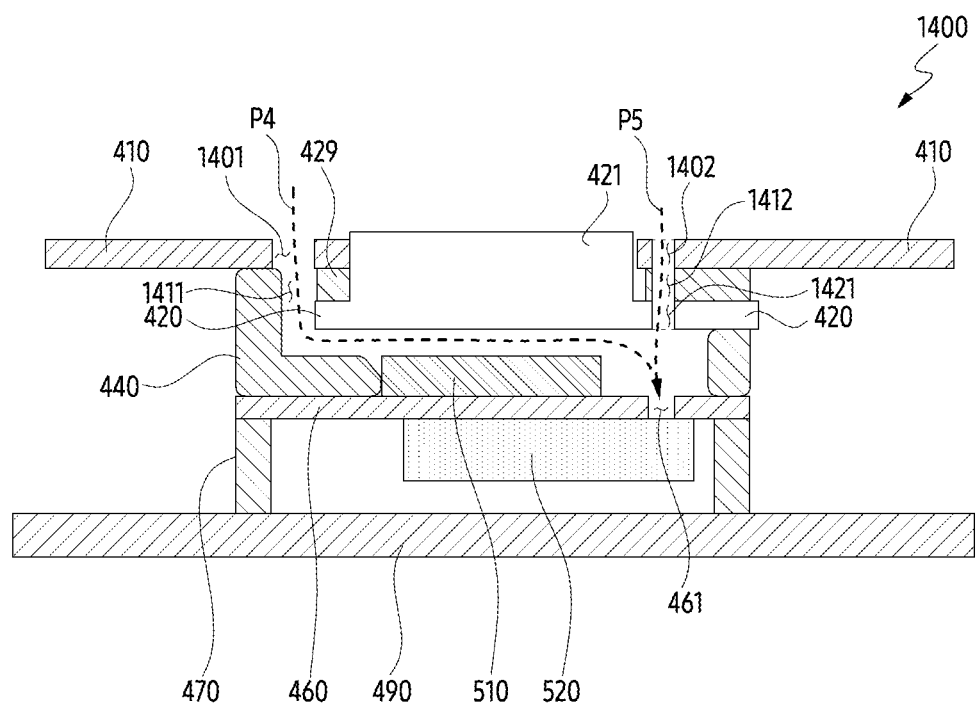
FIG. 14 is a cross-sectional view illustrating an example of a microphone hole formed on a rear plate of an electronic device according to an embodiment.

FIG. 14 is a cross-sectional view illustrating an example of a microphone hole formed on a rear plate of an electronic device according to an embodiment.

Referring to FIG. 14, the electronic device 1400 may include the housing 410, the plate 420 including a transparent portion having a protruding portion 421 inserted into a first opening 411 formed in the housing 410, the first board 490, the sidewall structure 470 disposed on the first board 490, the second board 460 disposed on the sidewall structure 470, the flash module 510 disposed on the second board 460 between the second board 460 and the plate 420 including a transparent portion, and the flash module 510 disposed on the second board 460 in a space surrounded by the second board 460, the first board 490, and the sidewall structure 470.

According to an embodiment, the plate 420 including the transparent portion may be attached to the housing 410 by an adhesive member 429. A sealing member 440 may be disposed along a periphery of the second board 460.

According to an embodiment, when the gap between the first opening 1401 and the plate 420 including the transparent portion is narrow and transmission of the audio signal is not easy, the electronic device 1400 may include an additional opening in the housing 410. The housing 410 may include one of a first opening 1401 and a second opening 1402 distinct from an opening into which a portion of the plate 420 including the transparent portion is inserted.

According to an embodiment, when the housing 410 includes the first opening 1401, the first opening 1401 may be connected to a space in which the flash module 510 is disposed through a gap 1411 between the adhesive member 429 and the sealing member 440. The housing 410 forming the first opening 1401 may form the audio path P4 along the first opening 1401, the gap 1411, the space between the flash module 510 and the plate 420 including a transparent portion, and the through hole 461.

According to an embodiment, when the housing 410 includes the second opening 1402, the electronic device 1400 may further include, in the adhesive member 429, the third opening 1412 connecting with the second opening 1402. The plate 420 including a transparent portion may include the fourth opening 1421 connected to the second opening 1402 and the third opening 1412. The housing 410 forming the second opening 1402 may form an audio path P5 along the second opening 1402, the third opening 1412, the fourth opening 1421, and the through hole 461. For another example, when a gap between the adhesive member 429 and the side surface of the protruding portion 421 of the plate 420 including the transparent portion is connected to the second opening 1402, the third opening 1412 may be omitted. According to an embodiment, when a gap between the plate 420 including a transparent portion and the sealing member 440 is connected to the second opening 1402, such as the audio path P4, the fourth opening 1421 may be omitted. The second opening 1402, the third opening 1412, and the fourth opening 1421 may be disposed to at least partially overlap the through hole 461 when the housing 410 is viewed from above.

According to the above-described embodiment, when a gap between the plate 420 including the transparent portion and the opening into which the plate 420 including the transparent portion is inserted is narrow, by forming an additional opening for transmitting an audio signal to the housing 410 (e.g., a rear plate), the electronic device 1400 may form an audio path (e.g., a path P4 or a path P5) extending to a microphone.

Figure 15:
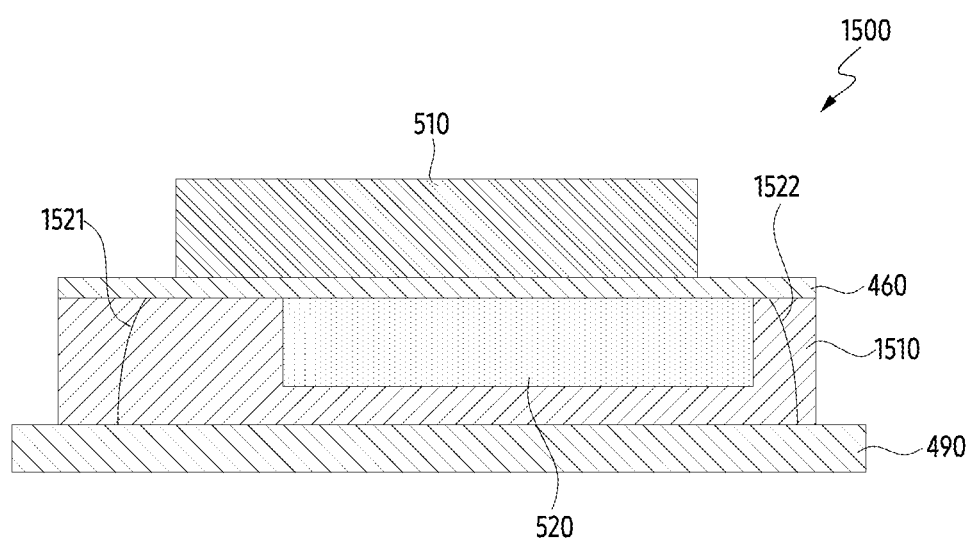
FIG. 15 is a cross-sectional view illustrating another example of a module including a flash module and a microphone according to an embodiment.

FIG. 15 is a cross-sectional view illustrating another example of a module including a flash module and a microphone according to an embodiment.

Referring to FIG. 15, the integration module 1500 may integrally form a flash module 510 and a microphone 520. The disposition of the flash module 510 and the microphone 520 included in the integration module 1500 may be similar to the disposition of the flash module 510 and the microphone 520 included in the electronic devices of FIGS. 6, 7, and 10 to 14.

According to an embodiment, the integration module 1500 may include a flash module 510, a microphone 520, a second board 460, a mold 1510, and bonding wires 1521, 1522. The microphone 520 may be disposed on one surface of the second board 460, and the flash module 510 may be disposed on the other surface of the second board 460.

According to an embodiment, the second board 460 and the first board 490 may be electrically connected by bonding wires 1521, 1522. The flash module 510 and the microphone 520 disposed on the second board 460 may be electrically connected to the first board 490 by bonding wires 1521, 1522. The integration module 1500 may be mounted on the first board 490 through a surface mounted device (SMD) or soldering.

According to an embodiment, the mold 1510 may be disposed on a surface of the second board 460 on which the microphone 520 is disposed. The mold 1510 may surround the microphone 520 disposed on the second board 460, and a surface in contact with the first board 490 may be formed to be substantially flat.

According to the above-described embodiment, the integration module 1500 may reduce the mounting space of the microphone 520 by integrally forming the flash module 510 and the microphone 520. For example, as illustrated in FIG. 6, in order to secure an emission angle of the flash module 510, the flash module 510 may be spaced apart from the first board 490. For being spaced apart from the flash module 510, thickness of the mold of the integration module 1500 may be determined, by disposing the microphone 520 in the mold 1510, a mounting space for the microphone 520 may be secured.

The integration module of FIG. 15 may be applied to the flash module 510 and the microphone 520 included in the electronic device of FIGS. 6, 7, and 9 to 14. For example, a space formed by the sidewall structure 470 and the second board 460 may be filled through a mold, and a separate module including the flash module 510 and the microphone 520 may be attached to the first board 490.

Figure 16A:
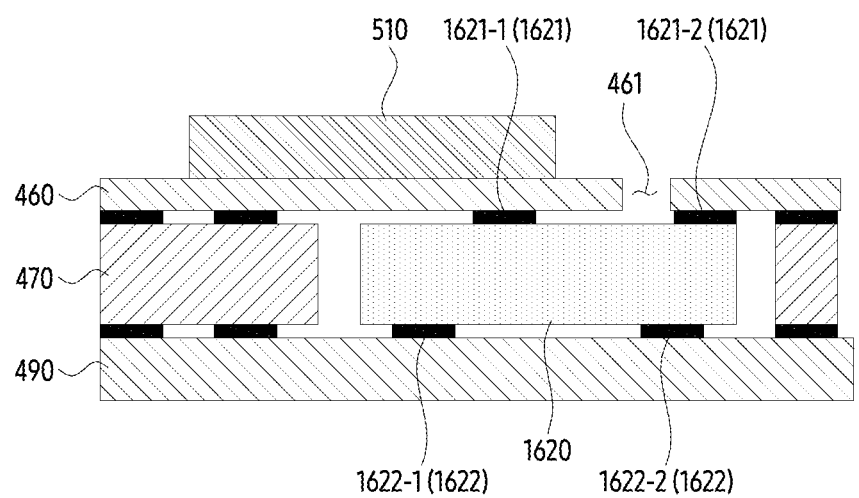
FIG. 16A is a cross-sectional view illustrating an example structure for reducing an impact applied to a microphone, according to an embodiment.
Figure 16B:
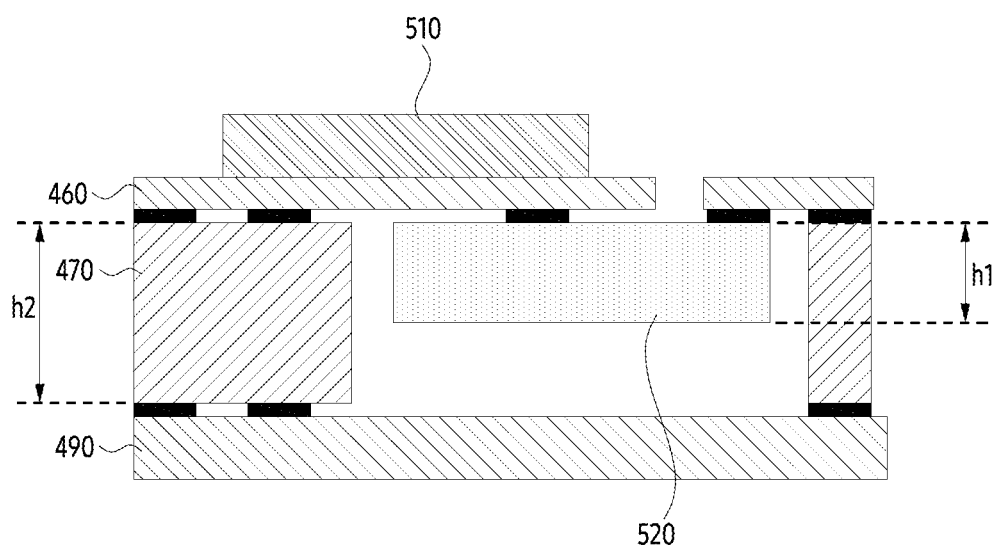
FIG. 16B is a cross-sectional view illustrating an example structure for securing a height of a flash module according to an embodiment.

FIG. 16A is a cross-sectional view illustrating an example structure for reducing an impact applied to a microphone, according to an embodiment. FIG. 16B is a cross-sectional view illustrating an example a structure for securing a height of a flash module according to an embodiment.

Referring to FIG. 16A, the first board 490 and the second board 460 may be electrically connected through a sidewall structure 470 that is an interposer. The flash module 510 and the microphone 520 disposed on the second board 460 may be electrically connected to the first board 490 through the sidewall structure 470 and the second board 460. The flash module 510 and the microphone 520 may transmit or receive signals through a processor (e.g., the processor 120 of FIG. 1) disposed on the first board 490.

According to an embodiment, the first board 490 and the second board 460 may include conductive pads 1621 and 1622 exposed to the outside. The conductive pad 1621 of the second board 460 may be a pad for electrical connection with the microphone 1620. A microphone 1620 may be disposed on one surface of the second board 460 facing the first board 490. The microphone 1620 may be connected to pads 1621-1 and 1621-2 exposed from the second board 460. Lines of the microphone 1620 may be connected to pads 1621-1 and 1621-2 of the second board 460.

According to an embodiment, when the microphone 1620 is directly connected to the grounding portion of the first board 490, noise may be transmitted to the microphone 1620. In order to reduce noise generation of the microphone 1620, the conductive pad 1622 of the first board 490 may be a NC (not connect) pad that is not connected to a line inside the first board 490. The microphone 1620 may be disposed on the pads 1622-1 and 1622-2 of the first board 490. The microphone 1620 may be connected to the pads 1622-1 and 1622-2 of the first board 490. Since the pads 1622-1 and 1622-2 of the first board 490 are NC pads, the pads 1622-1 and 1622-2 of the first board 490 may not provide electrical connection between the microphone 1620 and the first board 490. The pads 1622-1 and 1622-2 of the first board 490 may be fixed to the first board 490 in order to prevent/reduce the microphone 1620 from being damaged by an external impact of the electronic device.

According to the above-described embodiment, the pads 1622-1 and 1622-2 of the first board 490 do not provide an electrical connection to the microphone 1620, but may minimize/reduce impact or vibration transferred to the microphone 1620 due to external impact or shaking by fixing the microphone 1620 on the first board 490. The pads 1622-1 and 1622-2 of the first board 490 may prevent/reduce damage to the microphone 1620 by minimizing/reducing impact or vibration transmitted to the microphone 1620.

Referring to FIG. 16B, the sidewall structure 470 as an interposer may adjust a distance between the first board 490 and the second board 460.

According to an embodiment, the height h2 of the sidewall structure 470 may be longer than the height h1 of the microphone 520 in order to mount the microphone 520 between the first board 490 and the second board 460. The flash module 510 disposed on one surface of the second board 460 may need distance to be spaced apart from the first board 490 in order to secure an emission angle as illustrated in FIG. 6. In order to secure a distance to be spaced apart from the first board 490 to the flash module 510, the height of the sidewall structure 470 may be adjusted.

According to the above-described embodiment, by adjusting the height of the sidewall structure 470, in an electronic device having various thicknesses, the distance between the flash module 510 and a plate including a transparent portion (e.g., the plate 420 including the transparent portion of FIG. 4) may be minimized/reduced and thereby the flash module 510 may secure an emission angle.

According to an example embodiment, an electronic device (e.g., the electronic device 101 of FIG. 1, the electronic device 200 of FIG. 2, or the electronic device 400 of FIG. 4) may comprise: a housing (e.g., a housing 410 in FIG. 4) including a first opening (e.g., a first opening 411 of FIG. 4); a plate (e.g., the plate 420 including the transparent portion of FIG. 4) including a transparent portion, the plate including a protruding portion having a gap (e.g., gap 412 in FIG. 4) spaced apart from an inner circumference of the first opening, at least a portion of the protruding portion (e.g., a protruding portion 421 in FIG. 4) inserted into the first opening, and a second opening spaced apart from a periphery of the protruding portion; a first printed circuit board (e.g., the first board 490 of FIG. 4) disposed within the housing; at least one side wall (e.g., the sidewall structure 470 of FIG. 4) disposed on the first printed circuit board; a second printed circuit board (e.g., the second board 460 of FIG. 4) disposed between the first printed circuit board and the plate and supported by the at least one side wall; a microphone (e.g., microphone 520 in FIG. 5) disposed on a first surface of the second printed circuit board within a space surrounded by the first printed circuit board, the second printed circuit board and the at least one side wall; and a flash module comprising a flash (e.g., flash module 510 of FIG. 5) disposed a second surface of the second printed circuit board opposite to the first surface; wherein the second printed circuit board may include a through hole (e.g., through hole 461 in FIG. 5) facing the microphone for microphone to obtain a signal.

According to an example embodiment, the second printed circuit board may electrically disconnect the flash module and the microphone and may electrically connect to the first printed circuit board.

According to an example embodiment, a grounding portion may include a first grounding portion (e.g., the main grounding portion 801 of FIG. 8A) electrically disconnecting the flash module and the microphone and electrically connecting the first printed circuit board; a second grounding portion (e.g., the flash module grounding portion 803 of FIG. 8A) electrically disconnecting the first grounding portion and electrically connecting the flash module; and a third grounding portion (e.g., microphone grounding portion 805 of FIG. 8B) electrically disconnecting the first grounding portion and the second grounding portion and electrically connecting the microphone.

According to an example embodiment, the at least one side wall may include an interposer including a plurality of conductive vias electrically connecting the first printed circuit board and the second printed circuit board, wherein first conductive vias of the plurality of conductive vias extend from the first grounding portion to the first printed circuit board, wherein second conductive vias are distinct from the first conductive vias, the second conductive vias of the plurality of conductive vias extending from the second grounding portion to the first printed circuit board, and wherein third conductive vias are distinct from the first conductive vias and the second conductive vias, the third conductive vias of the plurality of conductive vias extending from the third grounding portion to the first printed circuit board.

According to an example embodiment, the second printed circuit board may include: a plurality of layers (e.g., a first layer 810 of FIG. 8A, a second layer 820 of FIG. 8B, a third layer 830 of FIG. 8C, and a fourth layer 840 of FIG. 8D), wherein a portion of the second grounding portion may be disposed on a first layer (e.g., a first layer 810 of FIG. 8A) in contact with one surface of the flash module among the plurality of layers, and wherein a portion of the third grounding portion may be disposed on a second layer (e.g., a fourth layer 840 of FIG. 8D) in contact with one surface of the microphone among the plurality of layers.

According to an example embodiment, a first portion of the first grounding portion (e.g., a first portion 813 of the main grounding portion 803 of FIG. 8A) may be disposed spaced apart from the portion of the second grounding portion (e.g., a first portion 811 of the flash module grounding portion 801 of FIG. 8A), in the first layer and wherein a second portion of the first grounding portion (e.g., the fourth portion 843 of the main grounding portion 803 of FIG. 8D) may be disposed spaced apart from a portion of the third grounding portion, in the second layer.

According to an example embodiment, the electronic device may further comprise a first grounding portion (e.g., main grounding portions 803 in FIGS. 8A, 8B, 8C, and 8D), wherein the first grounding portion is disposed on at least one of layers forming the second printed circuit board, overlaps the flash module or the microphone, and is electrically disconnected from the flash module and the microphone.

According to an example embodiment, the microphone may be surrounded by the second printed circuit board and the side wall.

According to an example embodiment, the audio path may be formed by the gap, a space between one surface of the housing including the first opening and a plate including the transparent portion, the second opening, and the through hole.

According to an example embodiment, the electronic device may further comprise: a seal including a first seal (e.g., a sealing member 440 of FIG. 4) disposed between the plate including the transparent portion and the second printed circuit board, and surrounding the flash module; wherein the second opening and the through hole may be connected to an internal space surrounded by the plate including the transparent portion, the second printed circuit board, and the first seal.

According to an example embodiment, the electronic device may further comprise: a second seal (e.g., an additional sealing member 941 of FIG. 9) distinct from the first seal; wherein the first seal and the second seal may surround a periphery of the second opening and a circumference of the through hole.

According to an example embodiment, an inner surface of the seal (e.g., a sealing member 1311 of FIG. 13) may be in contact with the flash module, and wherein a portion of the seal is in contact with a portion of the housing.

According to an example embodiment, a compression ratio of the seal may be 15% to 75%, and wherein a thermal conductivity of the seal may be 1 to 9 (W/m*K).

According to an example embodiment, a height of the inner surface of the seal is less than a height of the outer surface of the seal.

According to an example embodiment, the flash module, the microphone, the second printed circuit board, and the side wall may be integrally formed, and wherein the second printed circuit board may be electrically connected to the first printed circuit board by a conductive wire.

According to an example embodiment, a portion of the flash module may overlap a portion of the microphone when the flash module is viewed from above.

According to an example embodiment, the microphone may include a pad (e.g., a pad 1622 of FIG. 16A) disposed at between a surface facing the first printed circuit board of the microphone and the first printed circuit board, wherein the pad may be electrically disconnected the first printed circuit board.

According to an example embodiment, the second opening may overlap the second printed circuit board when the plate including the transparent portion is viewed from above.

According to an example embodiment, an electronic device (e.g., an electronic device 1400 of FIG. 14) may comprise: a housing (e.g., housing 410 in FIG. 14) including a first opening and a second opening; a plate (e.g., plate 420 including the transparent portion of FIG. 14) including a transparent portion, the plate including a protruding portion inserted into the first opening and a third opening spaced apart from the periphery of the protruding portion, a first printed circuit board (e.g., a first board 490 of FIG. 14) in the housing; at least one sidewall (e.g., the sidewall structure 470 of FIG. 14) disposed on the first printed circuit board, a second printed circuit board (e.g., the second board 460 of FIG. 14) facing the first printed circuit board and disposed on the at least one sidewall a microphone (e.g., a microphone 520 in FIG. 14) disposed a first surface of the second printed circuit board within a space surrounded by the first printed circuit board, the second printed circuit board and the at least one sidewall; and a flash module comprising a flash (e.g., the flash module 510 of FIG. 14) disposed a second surface of the second printed circuit board opposite to the first surface; wherein the second opening may be spaced apart from the plate including the transparent portion and may be formed facing the second printed circuit board, and wherein the second printed circuit board may include a through hole (e.g., a through hole 461 of FIG. 14) facing the microphone for microphone configured to obtain a signal.

According to an example embodiment, the third opening may overlap the through hole when the plate including the transparent portion is viewed from the outside and may be spaced apart from the plate including the transparent portion.

According to an example embodiment, the electronic device may further comprise: a seal (e.g., a sealing member 440 of FIG. 14) disposed between the plate including the transparent portion and the second printed circuit board and surrounding the flash module. The third opening and the through hole are connected to the space formed by the plate including the transparent portion, the second printed circuit board, and the seal.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
    a housing including a first opening;
    a plate including a transparent portion, the plate including a protruding portion forming a gap between an inner circumference of the first opening and the protruding portion, at least a portion of the protruding portion inserted into the first opening, and a second opening spaced apart from a periphery of the protruding portion;
    a first printed circuit board disposed within the housing;
    at least one side wall disposed on the first printed circuit board;
    a second printed circuit board disposed between the first printed circuit board and the plate and supported by the at least one side wall;
    a microphone disposed a first surface of the second printed circuit board within a space surrounded by the first printed circuit board, the second printed circuit board and the at least one side wall; and
    a flash module comprising a flash LED disposed a second surface of the second printed circuit board opposite to the first surface;
    wherein the second printed circuit board includes a through hole facing the microphone configured to obtain a signal for the microphone.

2. The electronic device according to claim 1, wherein the second printed circuit board includes a grounding portion electrically disconnecting the flash module and the microphone, and electrically connected to the first printed circuit board.

3. The electronic device according to claim 2, wherein the grounding portion includes:
    a first grounding portion electrically disconnecting the flash module and the microphone and electrically connecting the first printed circuit board;
    a second grounding portion electrically disconnecting the first grounding portion and electrically connecting the flash module; and
    a third grounding portion electrically disconnecting the first grounding portion and the second grounding portion and electrically connecting the microphone.

4. The electronic device according to claim 3, further comprising at least one side wall structure disposed between the first printed circuit board and the second printed circuit board:
    wherein the at least one side wall comprises: an interposer including a plurality of conductive vias electrically connecting the first printed circuit board and the second printed circuit board,
    wherein first conductive vias of the plurality of conductive vias extend from the first grounding portion to the first printed circuit board,
    wherein second conductive vias are distinct from the first conductive vias, the second conductive vias of the plurality of conductive vias extending from the second grounding portion to the first printed circuit board, and
    wherein third conductive vias are distinct from the first conductive vias and the second conductive vias, the third conductive vias of the plurality of conductive vias extending from the third grounding portion to the first printed circuit board.

5. The electronic device according to claim 3, wherein the second printed circuit board includes a plurality of layers,
    wherein a portion of the second grounding portion is disposed on a first layer among the plurality of layers in contact with one surface of the flash module, and
    wherein a portion of the third grounding portion is disposed on a second layer among the plurality of layers in contact with one surface of the microphone.

6. The electronic device according to claim 5, wherein a first portion of the first grounding portion is spaced apart from the portion of the second grounding portion, in the first layer, and
    wherein a second portion of the first grounding portion is spaced apart from a portion of the third grounding portion, in the second layer.

7. The electronic device according to claim 3, wherein the first grounding portion is disposed on at least one of layers of the second printed circuit board and overlaps the flash module or the microphone when the second printed circuit board is viewed from above.

8. The electronic device according to claim 1, wherein an audio path is defined by the gap, a space between one surface of the housing including the first opening; and the plate including the transparent portion, the second opening, and the through hole.

9. The electronic device according to claim 1, further comprising:
a seal including a first seal disposed between the plate and the second printed circuit board, and surrounding the flash module;
wherein the second opening and the through hole are connected to an internal space surrounded by the plate including the transparent portion, the second printed circuit board, and the first seal.

10. The electronic device according to claim 9, further comprising:
a second seal distinct from the first seal;
wherein the first seal and the second seal surround a circumference of the second opening and a circumference of the through hole.

11. The electronic device according to claim 9, wherein an inner surface of the first seal is in contact with the flash module, and
wherein a portion of the first seal is in contact with a portion of the housing.

12. The electronic device according to claim 11, wherein a compression ratio of the first seal is in a range of 15% to 75%, and
wherein a thermal conductivity of the first seal is in a range of 1 to 9 (W/m*K).

13. The electronic device according to claim 9, wherein a height of an inner surface of the first seal is less than a height of an outer surface of the first seal.

14. The electronic device according to claim 1, further comprising the side wall disposed between the first printed circuit board and the second printed circuit board, and integrally formed with the flash module, the microphone, and the second printed circuit board, are integrally formed, and
wherein the second printed circuit board electrically is connected to the first printed circuit board by a conductive wire.

15. The electronic device according to claim 1, wherein a portion of the flash module overlaps a portion of the microphone when the flash module is viewed from above.

16. The electronic device according to claim 1, wherein the microphone includes a pad disposed at a surface of the microphone facing the first printed circuit board, and
wherein the pad is electrically disconnected from the first printed circuit board.

17. The electronic device according to claim 1, wherein the second opening overlaps the second printed circuit board, when the plate including the transparent portion is viewed from above.

18. An electronic device comprising:
a housing including a first opening and a second opening;
a plate including a transparent portion, the plate including
a protruding portion inserted into the first opening and
a third opening spaced apart from a periphery of the protruding portion;
a first printed circuit board disposed into the housing;
at least one side wall disposed on the first printed circuit board;
a second printed circuit board disposed between the first printed circuit board and the plate and supported by the at least one side wall;
a microphone disposed on a first surface of the second printed circuit board within a space surrounded by the first printed circuit board, the second printed circuit board and the at least one side wall; and
a flash module comprising a flash LED disposed on a second surface of the second printed circuit board opposite to the first surface;
wherein the second opening is spaced apart from the plate including the transparent portion and faces the second printed circuit board, and
wherein the second printed circuit board includes a through hole facing the microphone configured to obtain a signal for the microphone.

19. The electronic device according to claim 18, wherein the third opening overlaps the through hole when the plate including the transparent portion is viewed from the outside and is spaced apart from the plate including the transparent portion.

20. The electronic device according to claim 18, further comprising:
a seal disposed between the plate including the transparent portion and the second printed circuit board, and surrounding the flash module;
wherein the third opening and the through hole are connected to a space surrounded by the plate including the transparent portion, the second printed circuit board, and the seal.

* * * * *